US008693563B2

United States Patent
Hwang et al.

(10) Patent No.: US 8,693,563 B2
(45) Date of Patent: Apr. 8, 2014

(54) METHOD OF TRANSMITTING AND RECEIVING ORTHOGONAL FREQUENCY DIVISION MULTIPLEXING (OFDM) SIGNAL USING MULTIPLE ANTENNAS, AND TRANSMITTER AND RECEIVER THEREOF

(75) Inventors: Sung-Hyun Hwang, Daejeon (KR); Yun Hee Kim, Seongnam-si (KR); Jin Soo Wang, Busan (KR); Jae Cheol Park, Gwangju-si (KR)

(73) Assignees: Electronics and Telecommunications Research Institute, Daejeon (KR); University-Industry Cooperations Group of Kyung Hee University, Yongin-Si, Gyeonggi-Do (KR)

( * ) Notice: Subject to any disclaimer, the term of this patent is extended or adjusted under 35 U.S.C. 154(b) by 554 days.

(21) Appl. No.: 12/943,515

(22) Filed: Nov. 10, 2010

(65) Prior Publication Data

US 2011/0200129 A1 Aug. 18, 2011

(30) Foreign Application Priority Data

Feb. 18, 2010 (KR) .......................... 10-2010-0014675
Apr. 15, 2010 (KR) .......................... 10-2010-0034843

(51) Int. Cl.
*H04B 7/06* (2006.01)
(52) U.S. Cl.
USPC ............................ 375/267; 375/296; 375/299
(58) Field of Classification Search
USPC ........................... 375/260, 295, 267, 296, 299
See application file for complete search history.

(56) References Cited

U.S. PATENT DOCUMENTS

| 2003/0133433 | A1* | 7/2003 | Cimini et al. | 370/342 |
| 2003/0202460 | A1* | 10/2003 | Jung et al. | 370/208 |
| 2004/0086054 | A1 | 5/2004 | Corral | |
| 2006/0120268 | A1 | 6/2006 | Bar-Ness et al. | |
| 2009/0052577 | A1* | 2/2009 | Wang | 375/299 |
| 2009/0296564 | A1* | 12/2009 | Kwon et al. | 370/210 |

FOREIGN PATENT DOCUMENTS

| EP | 2 091 198 A2 | 8/2009 |
| JP | 2009-016887 A | 1/2009 |
| KR | 1020040074325 A | 8/2004 |
| KR | 10-2007-0076395 | 7/2007 |
| KR | 10-2008-0103867 | 11/2008 |
| KR | 1020080109630 A | 12/2009 |

OTHER PUBLICATIONS

LeGoff, S., et al. "Selected Mapping without Side Information for PAPR Reduction in OFDM", IEEE Transactions on Wireless Communications, vol. 8, No. 7, pp. 3320-3325, Jul. 2009.

* cited by examiner

*Primary Examiner* — Shuwang Liu
*Assistant Examiner* — David Huang
(74) *Attorney, Agent, or Firm* — Kile Park Reed & Houtteman PLLC

(57) ABSTRACT

Provided is a transmitter for transmitting an orthogonal frequency division multiplexing (OFDM) signal using multiple antennas, including: a subgroup generator to divide data symbols of a frequency domain into a plurality of subgroups; an inverse fast Fourier transform (IFFT) unit to perform an IFFT with respect to each of the subgroups so as to generate partial signals of a time domain corresponding to the plurality of subgroups, respectively; a candidate OFDM signal generator to generate at least two candidate OFDM signals using a combination of the partial signals so that each of the partial signals is transmitted to one of transmit antennas; and a selector to select one of the at least two candidate OFDM signals.

13 Claims, 14 Drawing Sheets

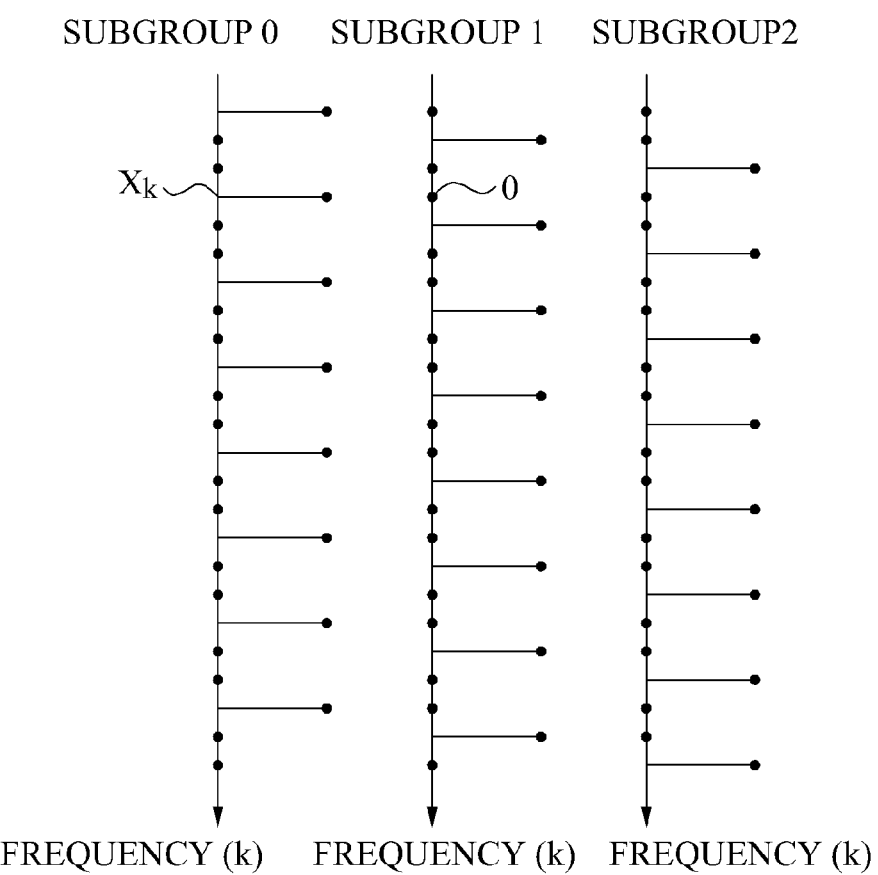

METHOD OF TRANSMITTING AND RECEIVING ORTHOGONAL FREQUENCY DIVISION MULTIPLEXING (OFDM) SIGNAL USING MULTIPLE ANTENNAS, AND TRANSMITTER AND RECEIVER THEREOF

CROSS-REFERENCE TO RELATED APPLICATIONS

This application claims the benefit of Korean Patent Application No. 10-2010-0014675, filed on Feb. 18, 2010, and Korean Patent Application No. 10-2010-0034843, filed on Apr. 15, 2010, in the Korean Intellectual Property Office, the disclosures of which are incorporated herein by reference.

BACKGROUND

1. Field of the Invention

Embodiments of the present invention relate to a transmitting and receiving method, a transmitter, and a receiver, and more particularly, to a method of transmitting and receiving an orthogonal frequency division multiplexing (OFDM) signal, and a transmitter and a receiver thereof.

2. Description of the Related Art

Due to a robust characteristic against multi-path fading, an orthogonal frequency division multiplexing (OFDM) scheme may readily transmit data at a high rate in a wideband. Accordingly, the OFDM scheme has been more actively applied to a digital broadcasting system, a next generation mobile communication system, and the like.

However, compared to a single subcarrier signal, an OFDM signal has a relatively great Peak-to-Average Power Ratio (PAPR). Accordingly, when configuring an OFDM system, the OFDM system may decrease a power efficiency of a transmit amplifier and may use a relatively expensive High Power Amplifier (HPA) compared to a single subcarrier system.

SUMMARY

An aspect of the present invention provides a method of transmitting and receiving an orthogonal frequency division multiplexing (OFDM) signal using multiple antennas, and a transmitter and a receiver thereof that may achieve an antenna diversity and also decrease a Peak-to-Average Power Ratio (PAPR) with a less complexity when a number of transmit antennas is greater than a number of data symbols desired to be transmitted.

Another aspect of the present invention also provides a method of transmitting and receiving an OFDM signal using multiple antennas, and a transmitter and a receiver thereof that enables a reception side to demodulate an OFDM signal without using side information by using a candidate OFDM signal generating scheme.

According to an aspect of the present invention, there is provided a transmitter for transmitting an OFDM signal using multiple antennas, including: a subgroup generator to divide data symbols of a frequency domain into a plurality of subgroups; an inverse fast Fourier transform (IFFT) unit to perform an IFFT with respect to each of the subgroups so as to generate partial signals of a time domain corresponding to the plurality of subgroups, respectively; a candidate OFDM signal generator to generate at least two candidate OFDM signals using a combination of the partial signals so that each of the partial signals is transmitted to one of transmit antennas; and a selector to select one of the at least two candidate OFDM signals.

The subgroup generator may divide, into the plurality of subgroups, frequency domain data symbols adjacent to the data symbols of the frequency domain, data symbols spaced apart from each other at equivalent intervals among the data symbols of the frequency domain, or data symbols randomly positioned in the frequency domain.

The candidate OFDM signal generator may generate the at least two candidate OFDM signals by combining the partial signals so that a correlation and an overlapping rate between the partial signals may decrease.

The at least two candidate OFDM signals may satisfy the following equation:

$$s_j^{(m)} = \sum_{p=0}^{P-1} i_{j,p}^{(m)} \tilde{x}_p$$

Here, $S_j^{(m)}$ denotes a $j^{th}$ antenna signal of an $m^{th}$ candidate OFDM signal, $i_{j,p}^{(m)}$ subject to $$\sum_{j=0}^{n_t-1} i_{j,p}^{(m)} = 1$$

denotes an indicator, and $\tilde{x}_p$ denotes a partial signal of the subject to denotes an indicator, and $p^{th}$ subgroup.

The at least two candidate OFDM signals may satisfy the following equation so that a similar number of subgroups may be assigned to each of transmit antennas:

$$\sum_{p=0}^{P-1} i_{j,p}^{(m)} = P/n_t$$

Here, P denotes a number of subgroups, $n_t$ denotes a number of antennas, and $i_{j,p}^{(m)}$ denotes the indicator indicating whether the $p^{th}$ subgroup is assigned to the $j^{th}$ antenna signal of the $m^{th}$ candidate OFDM signal and has a value of "1" when the $p^{th}$ subgroup is assigned, and has a value of "0" when the $p^{th}$ subgroup is unassigned.

The candidate OFDM signal generator may generate the at least two candidate OFDM signals by selecting a set of indicator vectors maximizing a minimum Hamming distance between indicator vectors used to generate a plurality of candidate OFDM signals, as expressed by the following equation:

$$\hat{I}_S = \arg\max_{I_S} d_{min}(I_S).$$

Here, $I_S = \{i_j^{(m)}, j=0, \ldots, n_t-1, m=0, 1, \ldots, M-1\}$ is a set of indicator vectors for $n_t$ transmit antennas and M candidate OFDM signals and $I_S$, $i_j^{(m)} = (i_{j,0}^{(m)}, i_{j,1}^{(m)}, \ldots, i_{j,P-1}^{(m)})$ denotes an indicator vector for the $j^{th}$ antenna signal of the $m^{th}$ candidate OFDM signal for P subgroups, with element $i_{j,p}^{(m)}$ denoting an indicator indicating whether a $p^{th}$ subgroup is assigned to a $j^{th}$ antenna signal of the $m^{th}$ candidate OFDM signal and has a value of "1" when the $p^{th}$ subgroup is assigned and has a value of "0" when the $p^{th}$ subgroup is unassigned subject to $$\sum_{j=0}^{n_t-1} i_{j,p}^{(m)} = 1, \quad d_{min}(I_S) = \min_{\substack{0 \leq j \leq n_t-1 \\ 0 \leq m_1 \neq m_2 \leq M-1}} w\left(t_j^{(m_1)} \oplus t_j^{(m_2)}\right)$$

is the minimum Hamming distance between indicator vectors in a set $I_S$, $\oplus$ denotes an exclusive OR, and w(•) denotes a Hamming weight function counting the number of elements having a value of "1" in the argument vector.

The candidate OFDM signal generator may generate the at least two candidate OFDM signals by performing a phase shift with respect to the combination of the partial signals.

The selector may select one of the at least two candidate OFDM signals based on a PAPR of each of the at least two candidate OFDM signals.

According to another aspect of the present invention, there is provided a transmitter for transmitting an OFDM signal using multiple antennas, including: a space time encoder to encode a symbol stream of a frequency domain into at least two Space Time Block Code (STBC) symbol streams; a subgroup generator to divide the at least two STBC symbol streams into a plurality of subgroups; an IFFT unit to perform an IFFT with respect to each of the subgroups so as to generate partial signals of a time domain corresponding to the plurality of subgroups, respectively; a candidate OFDM signal generator to generate at least two candidate OFDM signals using a combination of the partial signals so that each of the partial signals is transmitted to one of transmit antennas; and a selector to select one of the at least two candidate OFDM signals.

According to still another aspect of the present invention, there is provided a method of transmitting an OFDM signal using multiple antennas, including: dividing data symbols of a frequency domain into a plurality of subgroups; performing an IFFT with respect to each of the subgroups so as to generate partial signals of a time domain corresponding to the plurality of subgroups, respectively; generating at least two candidate OFDM signals using a combination of the partial signals so that each of the partial signals is transmitted to one of transmit antennas; selecting one of the at least two candidate OFDM signals; and inserting a cyclic prefix into the selected candidate OFDM signal and transmitting the candidate OFDM signal with the inserted cyclic prefix using a transmit antenna.

The generating may include generating the at least two candidate OFDM signals by combining the partial signals so that a correlation and an overlapping rate between the partial signals decreases.

The at least two candidate OFDM signals may satisfy the following equation:

$$s_j^{(m)} = \sum_{p=0}^{P-1} i_{j,p}^{(m)} \tilde{x}_p$$

Here, $S_j^{(m)}$ denotes a $j^{th}$ antenna signal of an $m^{th}$ candidate OFDM signal, $i_{j,p}^{(m)}$ subject to $$\sum_{j=0}^{n_t-1} i_{j,p}^{(m)} = 1$$

denotes an indicator, and $\tilde{x}_p$ denotes a partial signal of the $p^{th}$ subgroup.

The selecting may include selecting one of the at least two candidate OFDM signals based on a PAPR of each of the at least two candidate OFDM signals.

According to yet another aspect of the present invention, there is provided a method of transmitting an OFDM signal using multiple antennas, including: encoding a symbol stream of a frequency domain to at least two STBC symbol streams; dividing the at least two STBC symbol streams into a plurality of subgroups; performing an IFFT with respect to each of the subgroups so as to generate partial signals of a time domain corresponding to the plurality of subgroups, respectively; generating at least two candidate OFDM signals using a combination of the partial signals so that each of the partial signals is transmitted to one of transmit antennas; selecting one of the at least two candidate OFDM signals; and inserting a cyclic prefix into the selected candidate OFDM signal to transmit the candidate OFDM signal with the inserted cyclic prefix.

According to a further another aspect of the present invention, there is provided a method of receiving an OFDM signal using multiple antennas, including: estimating a channel frequency response between a transmitter including a plurality of transmit antennas and a receiver including at least one receive antenna; calculating, based on the channel frequency response, a frequency response corresponding to each of candidate OFDM signals that are candidates of an OFDM signal transmitted from the transmitter; selecting one of the candidate OFDM signals using the frequency response corresponding to each of the candidate OFDM signals; and demodulating data symbols transmitted from the transmitter, based on the selected candidate OFDM signal.

The selecting may include selecting one of the candidate OFDM signals so that a difference between an actual per-subcarrier reception power and a per-subcarrier reception power of each of the candidate OFDM signals may be minimized.

The selecting may include applying a maximum likelihood scheme of selecting one of the candidate OFDM signals so that a distance between an actual received signal and an estimated received signal with respect to each of the candidate OFDM signals may be minimized

EFFECT

According to embodiments of the present invention, it is possible to significantly decrease a number of inverse fast Fourier transforms (IFFTs) by performing an IFFT with respect to each of subgroups, and thereby decrease a complexity.

Also, according to embodiments of the present invention, a receiver may not receive, from a transmitter, side information associated with a selected orthogonal frequency division multiplexing (OFDM) signal. The receiver may detect a candidate OFDM signal using a relatively simple scheme by making partial signals formed in subgroups correspond to different antennas and thereby generating candidate OFDM signals.

Also, according to embodiments of the present invention, it is possible to enhance a Peak-to-Average Power Ratio (PAPR) by selecting a signal having a relatively low correlation when selecting a candidate OFDM signal.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which:

FIGS. 3A through 3C are diagrams illustrating an example of generating a subgroup according to an embodiment of the present invention;

DETAILED DESCRIPTION

Figure 1:
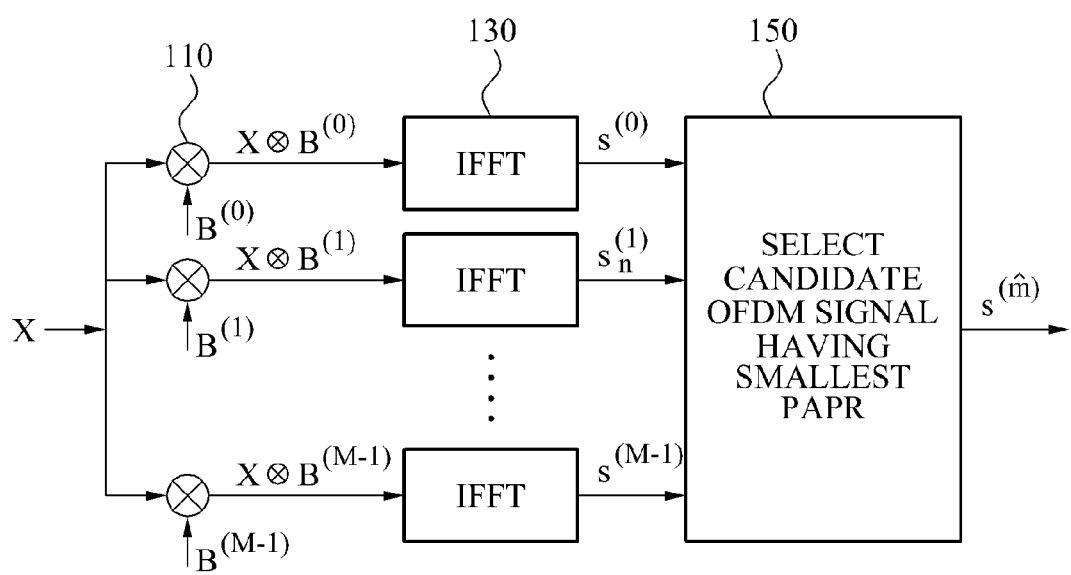
FIG. 1 is a diagram illustrating a SeLective Mapping (SLM) based Peak-to-Average Power Ratio (PAPR) reduction scheme according to a related art.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

When a number of subcarriers is N and a modulation symbol transmitted using a $k^{th}$ subcarrier of a frequency domain is $X_k$, an orthogonal frequency division multiplexing (OFDM) signal may be represented in a discrete time domain by the following equation:

$$x_n = \frac{1}{\sqrt{N}} \sum_{k=0}^{N-1} X_k \exp(j2\pi kn/N),$$

$$0 \le n \le N-1$$

When a discrete time domain OFDM signal is expressed by a vector, the discrete time domain OFDM signal may be $x=[x_0$ $x_1 \ldots x_{N-1}]$ and a Peak-to-Average Power Ratio (PAPR) of this signal may be defined as follows.

$$PAPR\{x\} = \frac{\max_{0 < n < N-1}[|x_n|^2]}{E[|x_n|^2]}.$$

Here, $E[\bullet]$ denotes an expectation value.

Various types of PAPR reduction schemes may be applied. Among the PAPR reduction schemes, a SeLective Mapping (SLM) scheme in which a logical configuration of a circuit is simple without a signal distortion will be described with reference to FIG. 1.

FIG. 1 is a diagram illustrating an SLM based PAPR reduction scheme according to a related art.

Referring to FIG. 1, in operation 110, a transmitter may multiply data symbols $X=[X_0\ X_1\ \ldots\ X_{N-1}]$ to be transmitted using a subcarrier by an M number of $B_{(m)}=[b_0^{(m)}\ b_1^{(m)}\ \ldots\ b_{N-1}^{(m)}]$, $m=0, 1, \ldots, M-1$. In FIG. 1, $X \otimes B^{(m)}$ indicates a multiplication between elements. In operation 130, by performing an inverse fast Fourier transform (IFFT), M candidate OFDM signals may be generated as follows:

$$x^{(m)} = [x_0^{(m)} x_1^{(m)} \ldots x_{N-1}^{(m)}],$$

$$m = 0, 1, \ldots, M-1,$$

where $$x_n^{(m)} = \frac{1}{\sqrt{N}} \sum_{k=0}^{N-1} b_k^{(m)} X_k \exp(j2\pi kn/N),$$

$$0 \le n \le N-1.$$

In operation 150, the transmitter may select, from the M candidate OFDM signals, a candidate OFDM signal $X^{(\hat{m})}$ having a smallest PAPR.

When a single candidate OFDM signal is generated, a probability that a PAPR of the single candidate OFDM signal is greater than $\Gamma_o$ may be assumed as $Pr[PAPR > \Gamma_o]$. In this instance, when independent M candidate OFDM signals are generated from the same data symbol and then a candidate OFDM signal having a smallest PAPR is selected, $Pr[PAPR > \Gamma_o]^M$. Accordingly, the probability that the PAPR is greater than $\Gamma_o$ may decrease.

A scheme of generating a plurality of independent candidate OFDM signals and selecting a candidate OFDM signal having a smallest PAPR may be applicable to a multiple input multiple output (MIMO) communication scheme.

For example, it may be assumed that data symbols $X_0=[X_{0,0}\ X_{0,1}\ \ldots\ X_{0,N-1}]$ and $X_1=[X_{1,0}\ X_{1,1}\ \ldots\ X_{1,N-1}]$ of a frequency domain desired to be transmitted using two antennas are divided into $P=N/L$ sub-blocks $X_{i,p}=[X_{i,pL}\ \ldots\ X_{i,pL+L-1}]^T$ having a length L. Here, it is possible to generate a candidate OFDM signal by changing an antenna index or performing a phase shift for each sub-block with respect to the data symbols to be transmitted using two antennas.

In this case, frequency domain data symbols $(S_0^{(m)}, S_1^{(m)})$ for generating different four candidate OFDM signals may be generated as follows:

$$S_0^{(0)} = [X_{1,1} X_{1,2} \ldots X_{1,P}], S_1^{(0)} = [X_{2,1} X_{2,2} \ldots X_{2,P}]$$

$$S_0^{(1)} = [-X_{1,1} X_{1,2} \ldots X_{1,P}], S_1^{(1)} = [-X_{2,1} X_{2,2} \ldots X_{2,P}]$$

$S_0^{(2)} = [X_{2,1} X_{1,2} \ldots X_{1,P}], S_1^{(2)} = [X_{1,1} X_{2,2} \ldots X_{2,P}]$ $S_0^{(3)} = [-X_{2,1} X_{1,2} \ldots X_{1,P}], S_1^{(3)} = [-X_{1,1} X_{2,2} \ldots X_{2,P}]$ When the above process is performed for each sub-block, a total M of multi-antenna symbol streams may be generated in different frequency domains. Here, $M=4^P$. By performing an IFFT with respect to each of the generated multi-antenna symbol streams for each antenna, it is possible to obtain an OFDM signal $S_i^{(m)} = \text{IFFT}[S_i^{(m)}]$ of the time domain and thereby generate a total M of candidate OFDM signals ($s_0^{(m)}$, $s_1^{(m)}$).

A PAPR may be calculated for each antenna of each candidate OFDM signal. A case having a largest PAPR may be selected for each candidate OFDM signal, and a candidate OFDM signal having a smallest PAPR may be selected and thereby be transmitted.

When generating a candidate OFDM signal, a large number of candidate OFDM signals may be generated by exchanging sub-blocks between multiple antennas, instead of shifting only a phase in a single antenna.

However, in this case, as a number of candidate OFDM signals increases, a complexity may increase in generating the candidate OFDM signals. In addition, the receiver may need to be aware of which candidate OFDM signal has been transmitted for demodulation.

Figure 2:
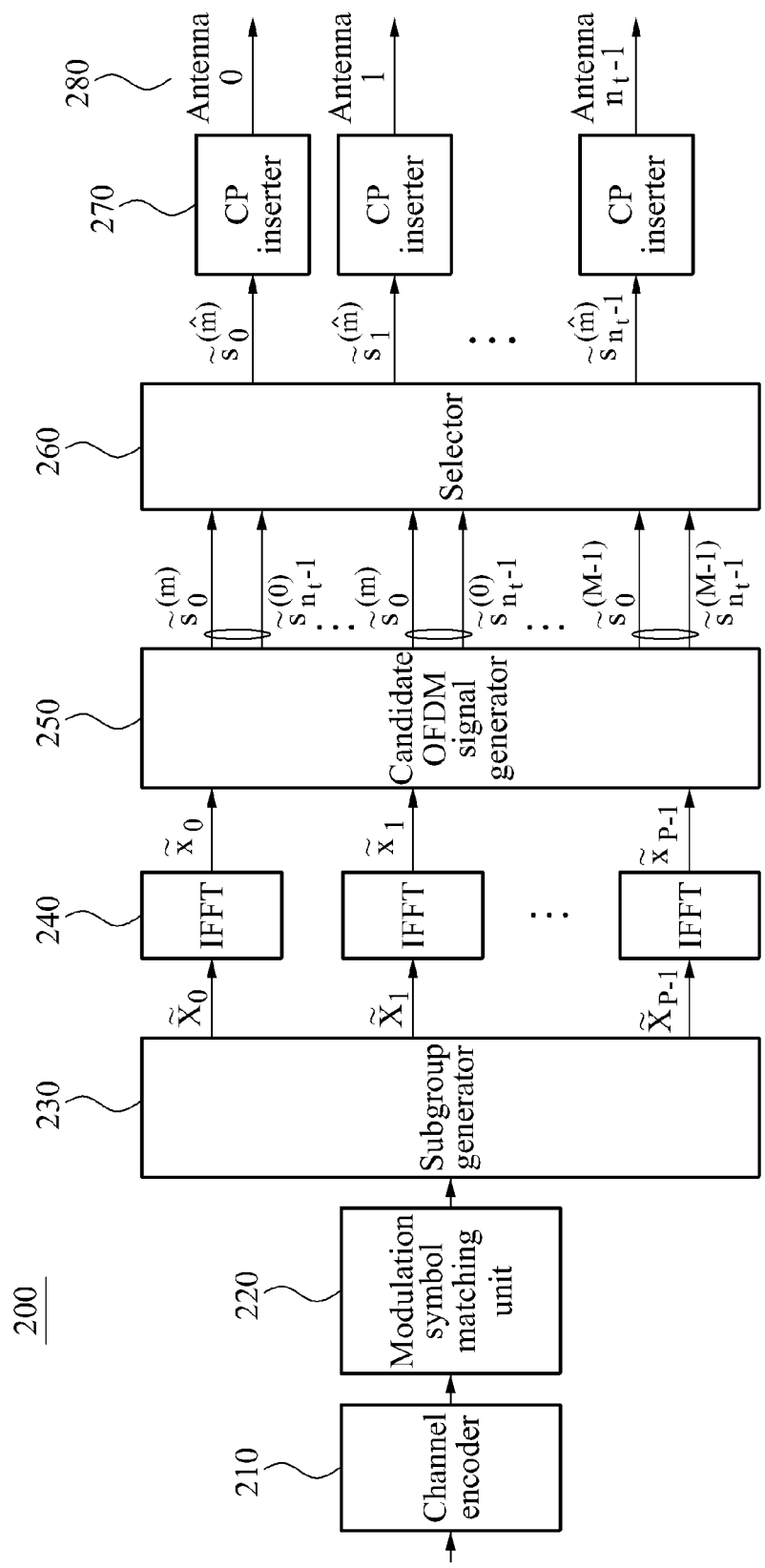
FIG. 2 is a block diagram illustrating a transmitter for transmitting an orthogonal frequency division multiplexing (OFDM) signal using multiple antennas according to an embodiment of the present invention.

FIG. 2 is a block diagram illustrating a transmitter 200 for transmitting an OFDM signal using multiple antennas according to an embodiment of the present invention.

Here, an antenna switching diversity scheme in a multi-antenna OFDM transmitter including at least two transmit antennas may be considered.

The antenna switching diversity scheme may divide, by $$\frac{1}{n_t},$$

frequency domain data symbols $X = [X_0 X_1 \ldots X_{N-1}]$ of an OFDM signal in which a number of subcarriers is N and thereby transmit the divided frequency domain data symbol using different transmit antennas.

For example, when the number $n_t$ of transmit antennas is two, the data symbols $X = [X_0 X_1 \ldots X_{N-1}]$ may be divided into two groups $[X_0 \ 0 \ X_2 \ 0 \ X_4 \ldots 0 \ X_{N-2} \ 0]$ and $[0 \ X_1 \ 0 \ X_3 \ 0 \ldots 0 \ X_{N-1}]$, which may be transmitted using the different transmit antennas, respectively.

To reduce a PAPR, the data symbols $X = [X_0 X_1 \ldots X_{N-1}]$ may be divided into subgroups $\{\tilde{X}_0, \tilde{X}_1, \ldots, \tilde{X}_{P-1}\}$. Partial signals of a time domain corresponding to each of the subgroups may be generated.

A $k^{th}$ element of a subgroup $\tilde{X}_p$ may be represented as $$\tilde{X}_{p,k} = \begin{cases} X_k, & k \in \Pi_p \\ 0, & k \notin \Pi_p. \end{cases}$$

Here, $0 \leq k \leq N-1$.

$\Pi_p$ denote a set of sub-carrier indexes of data symbols constituting a $p^{th}$ subgroup, and may be mutually exclusive $\Pi_p \cap \Pi_{p'} = \emptyset$, if $p \neq p'$ and have a characteristic of $$\bigcup_{p=0}^{P-1} \Pi_p = \{0, 1, \ldots, N-1\}$$

to satisfy $$X = \sum_{p=0}^{P-1} \tilde{X}_p.$$

Referring to FIG. 2, the multi-antenna OFDM transmitter 200 may include a subgroup generator 230, a plurality of IFFT units 240, a candidate OFDM signal generator 250, and a selector 260.

Also, the multi-antenna OFDM transmitter 200 may further include a channel encoder 210, a modulation symbol matching unit 220, a plurality of cyclic prefix (CP) inserters 270, and a plurality of antennas 280.

The channel encoder 210 may perform error correction coding (ECC) and interleaving of an information bitstream desired to be transmitted.

The modulation symbol matching unit 220 may match an output of the channel encoder 210 with a modulation symbol, for example, a binary phase shifting keying (BPSK), a quadrature phase shift keying (QPSK), a quadrature amplitude modulation (QAM), and the like.

The subgroup generator 230 may divide data symbols of a frequency domain into a plurality of subgroups. For example, using the output of the modulation symbol matching unit 220, the subgroup generator 230 may divide data symbols $X = [X_0 X_1 \ldots X_{N-1}]$ into P subgroups $\{\tilde{X}_0, \tilde{X}_1, \ldots, \tilde{X}_{P-1}\}$.

Prior to performing the above process, the subgroup generator 230 may perform a serial conversion or a parallel conversion with respect to the data symbols.

As shown in FIGS. 3A through 3C and FIG. 4, the subgroup generator 230 may divide, into the plurality of subgroups, frequency domain data symbols adjacent to the data symbols of the frequency domain, data symbols spaced apart from each other at equivalent intervals among the data symbols of the frequency domain, or data symbols randomly positioned in the frequency domain. A scheme of dividing data symbols into a plurality of subgroups will be described with reference to FIGS. 3A through 3C and FIG. 4.

The plurality of IFFT units 240 may individually perform an IFFT with respect to the plurality of subgroups so as to generate partial signals of a time domain corresponding to the plurality of subgroups, respectively.

Specifically, the plurality of IFFT units 240 may perform the IFFT with respect to the plurality of subgroups $\{\tilde{X}_0, \tilde{X}_1, \ldots, \tilde{X}_{P-1}\}$, respectively, and thereby generate partial signals $\tilde{x}_p = \text{IFFT}\{\tilde{X}_p\}$ of the time domain.

Here, due to a linearity of an IFFT process, the partial signals $\tilde{x}_0, \tilde{x}_1, \ldots, \tilde{x}_{P-1}$ of the time domain may satisfy $$x = IFFT\{X\} = \sum_{p=0}^{P-1} \tilde{x}_p.$$

The candidate OFDM signal generator 250 may generate at least two candidate OFDM signals using a combination of the partial signals so that each of the partial signals may be transmitted to one of transmit antennas. In this instance, the candidate OFDM signal generator 250 may generate at least two candidate OFDM signals $\{s_0^{(m)}, s_1^{(m)}, \ldots, s_{n_t-1}^{(m)}\}$, m=0, 1, ..., M−1, satisfying the following Equation 1-1, Equation 1-2, or Equation 3:

$$s_j^{(m)} = \sum_{p=0}^{P-1} i_{j,p}^{(m)} \tilde{x}_p \quad \text{[Equation 1-1]}$$

Here, $S_j^{(m)}$ denotes a $j^{th}$ antenna signal of an $m^{th}$ candidate OFDM signal, $i_{j,p}^{(m)}$ subject to $$\sum_{j=0}^{n_t-1} i_{j,p}^{(m)} = 1$$

denotes an indicator, and $\tilde{x}_p$ denotes a partial signal of the $p^{th}$ subgroup. Also, $\tilde{x}_p$ may have a characteristic of $$\sum_{j=0}^{n_t-1} i_{j,p}^{(m)} = 1.$$

Also, the at least two candidate OFDM signals may satisfy the following Equation 1-2 so that a similar number of subgroups may be assigned to each of transmit antennas:

$$\sum_{p=0}^{P-1} i_{j,p}^{(m)} = P/n_t \quad \text{[Equation 1-2]}$$

Here, p denotes a number of subgroups and $n_t$ denotes a number of antennas.

For example, when $n_t$=2 and P=4, the candidate OFDM signal generator 250 may generate different candidate OFDM signals of which M=3. An indicator vector $i_j^{(m)} = (i_{j,0}^{(m)}, i_{j,1}^{(m)}, i_{j,2}^{(m)}, i_{j,3}^{(m)})$ with respect to the $j^{th}$ antenna signal of the $m^{th}$ candidate OFDM signal, and candidate OFDM signals according thereto may be represented by the following Equation 2:

$i_0^{(0)}=(1,1,0,0), i_1^{(0)}=(0,0,1,1) \Rightarrow s_0^{(0)}= \tilde{x}_0+\tilde{x}_1, s_1^{(0)}=\tilde{x}_2+\tilde{x}_3$ $i_0^{(1)}=(1,0,1,0), i_1^{(1)}=(0,10,1) \Rightarrow s_0^{(1)}= \tilde{x}_0+\tilde{x}_2, s_1^{(1)}=\tilde{x}_1+\tilde{x}_3$ $i_0^{(2)}=(1,0,0,1), i_1^{(2)}=(0,1,1,0) \Rightarrow s_0^{(2)}= \tilde{x}_0+\tilde{x}_3, s_1^{(2)}=\tilde{x}_1+\tilde{x}_2$ [Equation 2]

Depending on embodiments, the candidate OFDM signal generator 250 may generate at least two candidate OFDM signals by performing a phase shift with respect to a combination of partial signals.

Specifically, to more independently express a PAPR value of each candidate OFDM signal, the candidate OFDM signal generator 250 may generate the at least two candidate OFDM signals by performing the phase shift with respect to the combination of partial signals. For this, by reducing a correlation between the candidate OFDM signals of Equation 1-1, it is possible to perform the phase shift with respect to the combination of partial signals as given by the following Equation 3:

$$s_j^{(m)} = \sum_{p=0}^{P-1} i_{j,p}^{(m)} \phi_p^{(m)} \tilde{x}_p \quad \text{[Equation 3]}$$

Here, $\phi_p^{(m)}$ denotes a phase shift value given to a $p^{th}$ partial signal when generating the $m^{th}$ candidate OFDM signal.

Through the above phase shift, it is possible to decrease the correlation between PAPR values, while not increasing a number of candidate OFDM signals.

Also, the candidate OFDM signal generator 250 may generate the at least two candidate OFDM signals by combining the partial signals so that a correlation and an overlapping rate between the partial signals may decrease.

For example, when $n_t$=2 and P=4, an example of the candidate OFDM signal generation according to Equation 3 may generate candidate OFDM signals of which M=3, which is the same as an example according to Equation 1-1. An example of the candidate OFDM signal generation according to the indicator vector $i_j^{(m)} = (i_{j,0}^{(m)}, i_{j,1}^{(m)}, i_{j,2}^{(m)}, i_{j,3}^{(m)})$ with respect to the $j^{th}$ antenna signal of the $m^{th}$ candidate OFDM signal and a phase shift vector $\Psi^{(m)} = (\phi_0^{(m)}, \phi_1^{(m)}, \ldots, \phi_{P-1}^{(m)})$ for each partial signal of the $m^{th}$ candidate OFDM signal may be represented by the following Equation 4:

$i_0^{(0)}=(1,1,0,0), i_1^{(0)}=(0,0,1,1), \Psi^{(0)}=$
$(1,-1,1,-1) \Rightarrow s_0^{(0)}= \tilde{x}_0-\tilde{x}_1, s_1^{(0)}=\tilde{x}_2-\tilde{x}_3$ $i_0^{(1)}=(1,0,1,0), i_1^{(1)}=(0,1,0,1), \Psi_{(1)}=$
$(1,1,-1,-1) \Rightarrow s_0^{(1)}= \tilde{x}_0-\tilde{x}_2, s_1^{(1)}=\tilde{x}_1-\tilde{x}_3$ $i_0^{(2)}=(1,0,0,1), i_1^{(2)}=(0,1,1,0), \Psi^{(2)}=$
$(1,-1,-1,1) \Rightarrow s_0^{(2)}= \tilde{x}_0+\tilde{x}_3, s_1^{(2)}=-\tilde{x}_1-\tilde{x}_2$ [Equation 4]

Also, the candidate OFDM signal generator 250 may generate the at least two candidate OFDM signals by selecting a set of indicator vectors maximizing a minimum Hamming distance between indicator vectors used to generate a plurality of candidate OFDM signals as expressed by Equation 5 below.

For example, when generating M candidate OFDM signals, a correlation between the candidate OFDM signals may need to be reduced to enhance a PAPR performance. Also, to increase a probability that a multi-antenna OFDM receiver may detect a candidate OFDM signal without using side information associated with the candidate OFDM signals, a number of common partial signals between the candidate OFDM signals may need to be small for each transmit antenna.

For the above operation, a set of indicator vectors may be selected to maximize a minimum Hamming distance between indicator vectors used to generate a plurality of candidate OFDM signals, as expressed by the following Equation 5:

$$\{i_j^{(m)}, j=0, \ldots, n_t-1, m=0, 1, \ldots, M-1\} = \quad \text{[Equation 5]}$$
$$\operatorname*{argmax}_{m \neq m'} \min_{0 \leq j \leq n_t-1} w(i_j^{(m)} \oplus i_j^{(m)'})$$

Here, $I_S = \{i_j^{(m)}, j=0, \ldots, n_t-1, m=0, 1, \ldots, M-1\}$ is a set of indicator vectors for $n_t$ transmit antennas and M candidate OFDM signals and $I_S$, $i_j^{(m)} = (i_{j,0}^{(m)}, i_{j,1}^{(m)}, \ldots, i_{j,P-1}^{(m)})$ denotes an indicator vector for the $j^{th}$ antenna signal of the $m^{th}$ candidate OFDM signal for P subgroups, with element $i_{j,p}^{(m)}$ denoting an indicator indicating whether a $p^{th}$ subgroup is assigned to a $j^{th}$ antenna signal of the $m^{th}$ candidate OFDM signal and has a value of "1" when the $p^{th}$ subgroup is assigned and has a value of "0" when the $p^{th}$ subgroup is unassigned subject to $$\sum_{j=0}^{n_t-1} i_{j,p}^{(m)} = 1, \ d_{min}(I_S) = \min_{\substack{0 \le j \le n_t-1 \\ 0 \le m_1 \ne m_2 \le M-1}} w\left(i_j^{(m_1)} \oplus i_j^{(m_2)}\right)$$

is the minimum Hamming distance between indicator vectors in a set $I_S$, $\oplus$ denotes an exclusive OR, and w(•) denotes a Hamming weight function counting the number of elements having a value of "1" in the argument vector.

For example, when $n_t=2$, P=8, and M=7, the following indicators may be selected to satisfy the condition of Equation 5:

$i_0^{(0)}=(1,1,1,1,0,0,0,0), i_1^{(0)}=(0,0,0,0,1,1,1,1)$ $i_0^{(1)}=(1,1,0,0,1,1,00), i_1^{(1)}=(0,0,1,1,0,0,1,1)$ $i_0^{(2)}=(1,0,1,0,1,0,1,0), i_1^{(2)}=(0,1,0,1,0,1,0,1)$ $i_0^{(3)}=(1,0,0,1,1,0,0,1), i_1^{(3)}=(0,1,1,0,0,1,1,0)$ $i_0^{(4)}=(1,0,1,0,0,1,0,1), i_1^{(4)}=(0,1,0,1,1,0,1,0)$ $i_0^{(5)}=(1,1,0,0,0,0,1,1), i_1^{(5)}=(0,0,1,1,1,1,0,0)$ $i_0^{(6)}=(1,0,0,1,0,1,1,0), i_1^{(6)}=(0,1,1,0,1,0,0,1)$

In this case, since the Hamming distance between the indicators for each antenna with respect to two different candidate OFDM signals is $w(i_j^{(m_1)} \oplus i_j^{(m_2)})=4$ at all times, it can be known that two different subgroups exist for each antenna with respect to the candidate OFDM signals.

The selector 260 may select one of the at least two candidate OFDM signals.

Also, the selector 260 may select a single candidate OFDM signal from the at least two candidate OFDM signals, based on a PAPR of each of the at least two candidate OFDM signals.

The selector 260 may calculate a PAPR for each antenna with respect to the at least two candidate OFDM signals, and obtain a PAPR of each candidate OFDM signal, that is, a maximum antenna PAPR value, and then select a candidate OFDM signal $\{s_0^{(\hat{m})}, s_1^{(\hat{m})}, \ldots, s_{n_t-1}^{(\hat{m})}\}$ minimizing the PAPR of each candidate OFDM signal.

For example, with respect to M candidate OFDM signals, the multi-antenna OFDM transmitter 200 may select a candidate index $$\hat{m} = \operatorname*{argmin}_m \max_{0 \le i \le n_t-1} PAPR\{s_i^{(m)}\}$$

having a smallest PAPR, and transmit a corresponding signal.

Candidate OFDM signals selected by the selector 260 may be inserted with a CP by the CP inserters 270, and then be converted to analog signals $\{s_0^{(\hat{m})}(t), s_1^{(\hat{m})}(t), \ldots, s_{n_t-1}^{(\hat{m})}(t)\}$, and thereby be transmitted for each antenna 280.

Each of the CP inserters 270 may insert the CP into an OFDM signal selected for each transmit antenna.

Figure 3A:
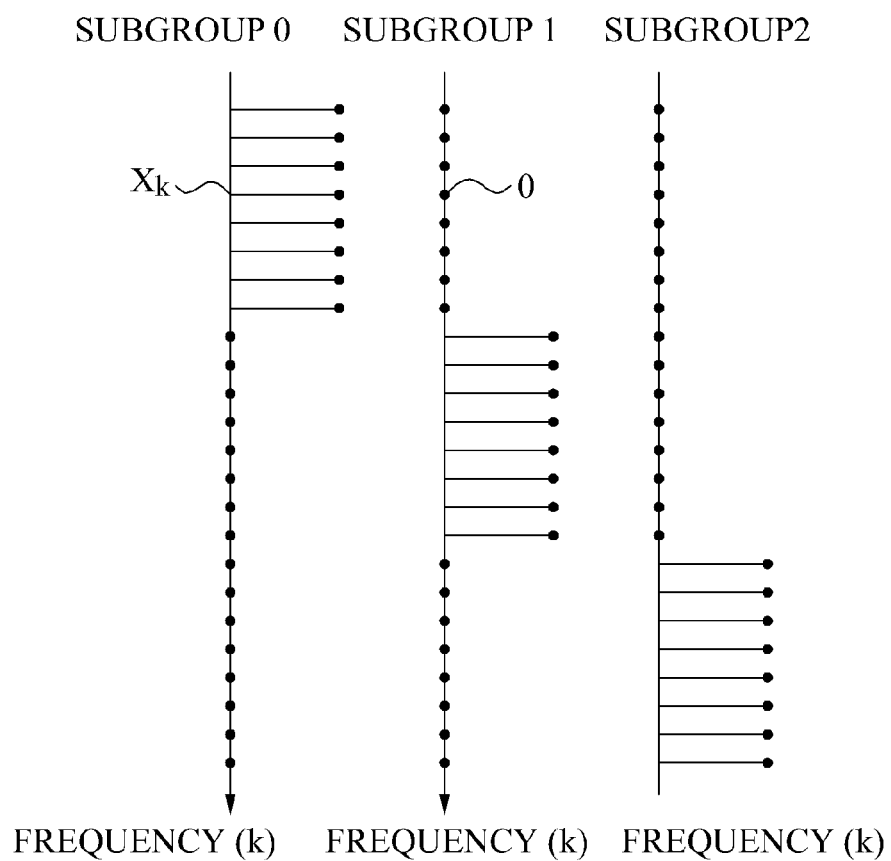
Figure 3C:
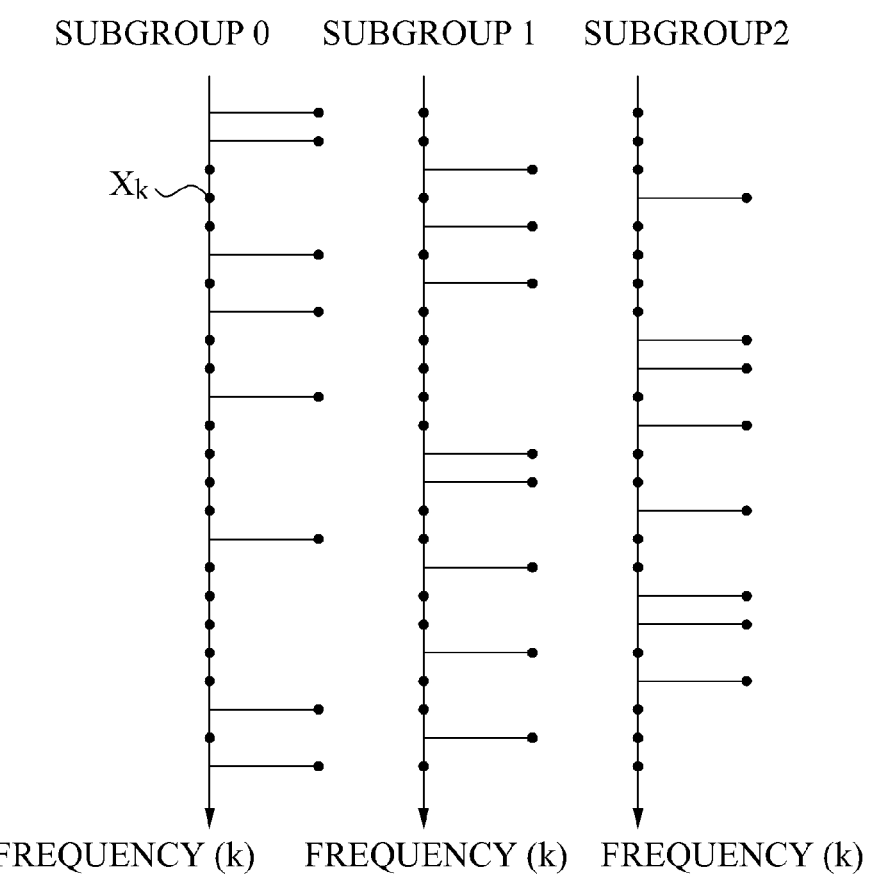

FIGS. 3A through 3C are diagrams illustrating an example of generating a subgroup according to an embodiment of the present invention.

FIG. 3A illustrates an example of configuring a plurality of subgroups using data symbols adjacent to data symbols of a frequency domain based on a cluster. FIG. 3B illustrates an example of configuring the plurality of subgroups using data symbols spaced apart from each other at equivalent intervals among the data symbols of the frequency domain based on a comb. FIG. 3C illustrates an example of configuring the plurality of subgroups using data symbols randomly positioned in the frequency domain.

Figure 4:
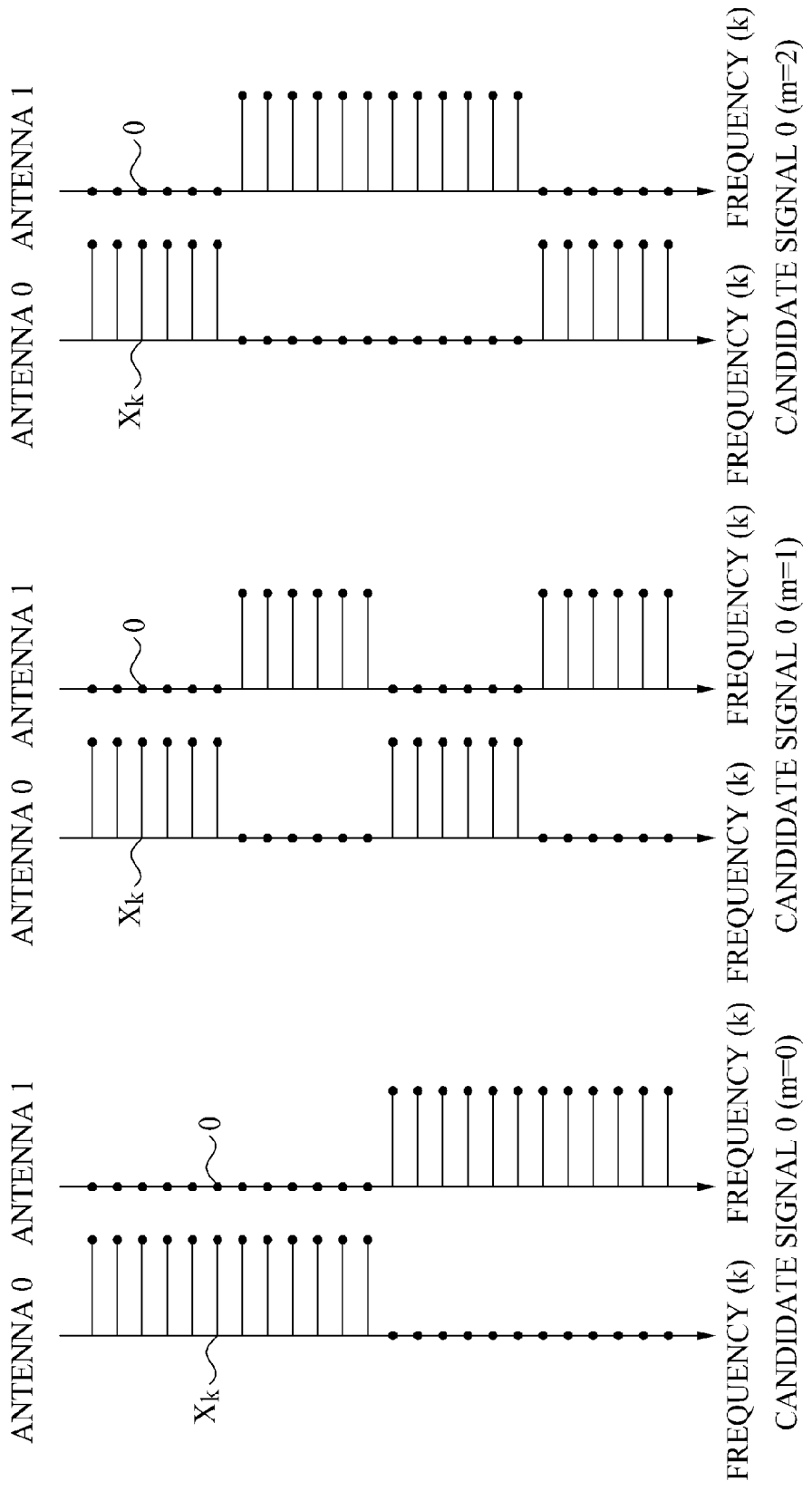
FIG. 4 is a diagram illustrating an example of generating a candidate OFDM signal using a cluster-based subgroup when $n_t=2$ and $P=4$ according to an embodiment of the present invention.

FIG. 4 is a diagram illustrating an example of generating a candidate OFDM signal using a cluster-based subgroup when $n_t=2$ and P=4 according to an embodiment of the present invention.

FIG. 4 shows a result of making data symbols of a frequency domain of three candidate OFDM signals correspond to a plurality of antennas when applying the cluster-based sub-group generation scheme of FIG. 3A and an indicator of Equation 2.

When $n_t$ denotes a number of antennas and P denotes a number of subgroups, the above correspondence scheme may generate a total $$\frac{P!}{(n_t!)[(P/n_t)!]^{n_t}}$$

of different candidate OFDM signals.

Figure 5:
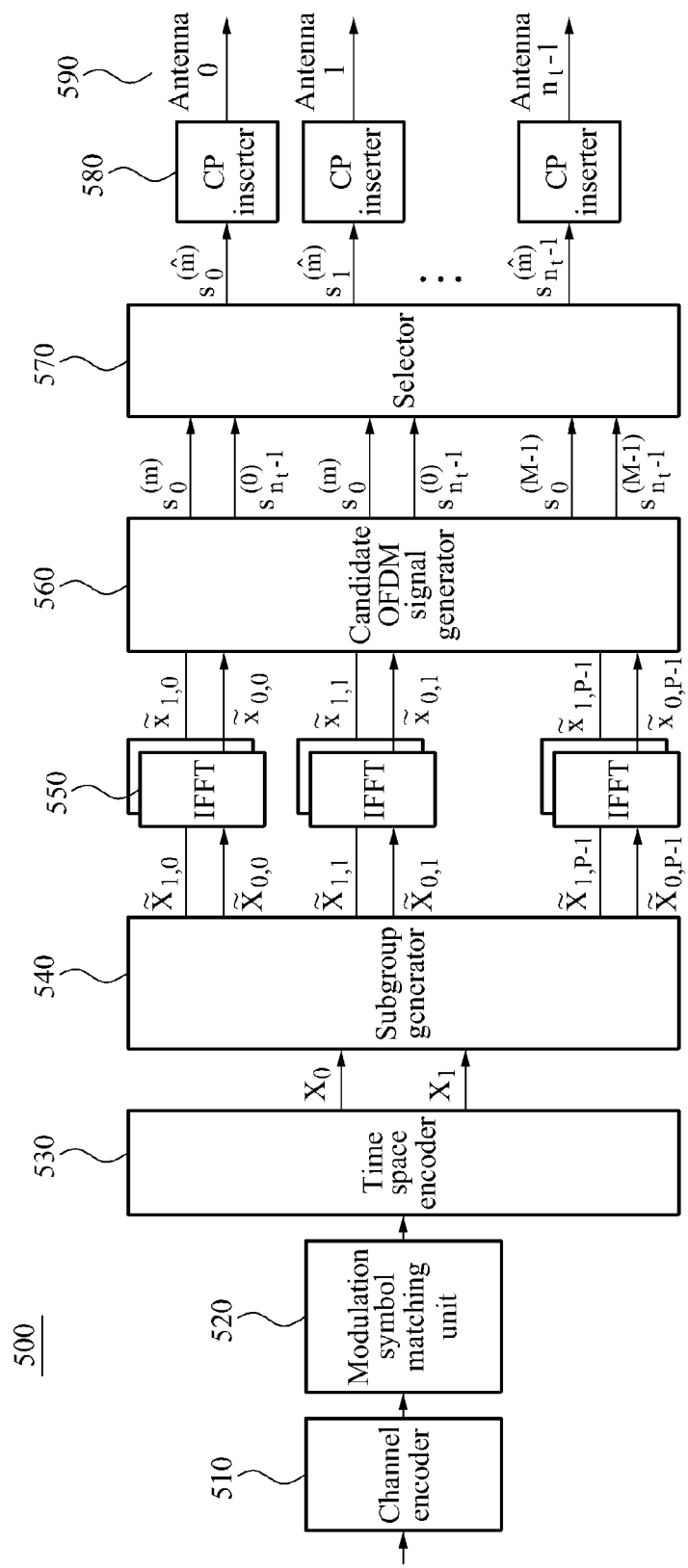
FIG. 5 is a block diagram illustrating a transmitter for transmitting an OFDM signal using multiple antennas according to another embodiment of the present invention.

FIG. 5 is a block diagram illustrating a transmitter 500 for transmitting an OFDM signal using multiple antennas according to another embodiment of the present invention.

Referring to FIG. 5, the multi-antenna OFDM transmitter 500 may include a space time encoder 530, a subgroup generator 540, a plurality of IFFT units 550, a candidate OFDM signal generator 560, and a selector 570.

Also, the multi-antenna OFDM transmitter 500 may further include a channel encoder 510, a modulation symbol matching unit 520, a plurality of CP inserters 580, and a plurality of antennas 590.

An information bitstream may be converted to a modulation symbol $\{W_k\}$.

The time space encoder 530 may configure a symbol $X=[X_0 \ X_1 \ldots X_{N-1}]$ of a frequency domain using the modulation symbol $\{X_k\}$, and may encode the symbol $X=[X_0 \ X_1 \ldots X_{N-1}]$ into at least two Space Time Block Code (STBC) symbol streams, for example, $X_0=[X_0 \ -X_1^* X_2 \ldots X_{N-2} -X_{N-1}^*]$ and $X_1=[X_1 \ X_0^* X_3 \ldots X_{N-1} X_{N-2}^*]$. Prior to performing the above process, the time space encoder 530 may perform a serial conversion or a parallel conversion.

The subgroup generator 540 may divide the at least two STBC symbol streams into a plurality of subgroups according to the subgroup generation scheme described above with respect to FIG. 2 through FIG. 4. For example, two STBC symbol streams $X_0=[X_0 \ -X_1^* X_2 \ldots X_{N-2} -X_{N-1}^*]$ and $X_1=[X_1 \ X_0^* X_3 \ldots X_{N-1} X_{N-2}^*]$ may be divided into subgroups $\{\tilde{X}_{0,p}, p=0, 1, \ldots, P-1\}$ and $\{\tilde{X}_{1,p}, p=0, 1, \ldots, P-1\}$.

The plurality of IFFT units 550 may individually perform an IFFT with respect to the plurality of subgroups so as to generate partial signals of a time domain corresponding to the plurality of subgroups, respectively.

Specifically, the plurality of IFFT units 550 may individually perform the IFFT with respect to subgroups $\{\tilde{X}_{0,p}, p=0, 1, \ldots, P-1\}$ and $\{\tilde{X}_{1,p}, p=0, 1, \ldots, P-1\}$, and may generate partial signals $\{\tilde{x}_{0,p}, p=0, 1, \ldots, P-1\}$ and $\{\tilde{x}_{1,p}, p=0, 1, \ldots, P-1\}$ of a time domain corresponding to each of the subgroups.

The candidate OFDM signal generator 560 may generate at least two candidate OFDM signals using a combination of the partial signals so that each of the partial signals may be transmitted to one of transmit antennas. In this instance, by expanding Equation 3, the $j^{th}$ antenna signal of the $m^{th}$ candidate OFDM signal may be represented by the following Equation 3:

$$s_j^{(m)} = \frac{1}{\sqrt{2}} \sum_{p=0}^{P-1} \sum_{l=0}^{1} i_{j,l,p}^{(m)} \varphi_{l,p}^{(m)} \tilde{x}_{l,p} \quad \text{[Equation 6]}$$

Here, $1/\sqrt{2}$ denotes a constant to equalize a transmission symbol energy.

The selector 570 may select one of the at least two candidate OFDM signals.

For example, the selector 570 may select, from the at least two candidate OFDM signals, a candidate OFDM signal $\{s_0^{(\hat{m})}, s_1^{(\hat{m})}, \ldots, s_{n_t-1}^{(\hat{m})}\}$ minimizing a PAPR.

Each of the CP inserters 580 may insert a CP into the candidate OFDM signal selected by the selector 570 for each antenna 590.

Next, the multi-antenna OFDM transmitter 500 may convert a corresponding output to an analog/radio frequency (RF) signal $\{S_0^{(\hat{m})}(t), S_1^{(\hat{m})}(t), \ldots, S_{n_t-1}^{(\hat{m})}(t)\}$, and thereby transmit the converted analog/RF signal for each antenna 590.

Figure 6:
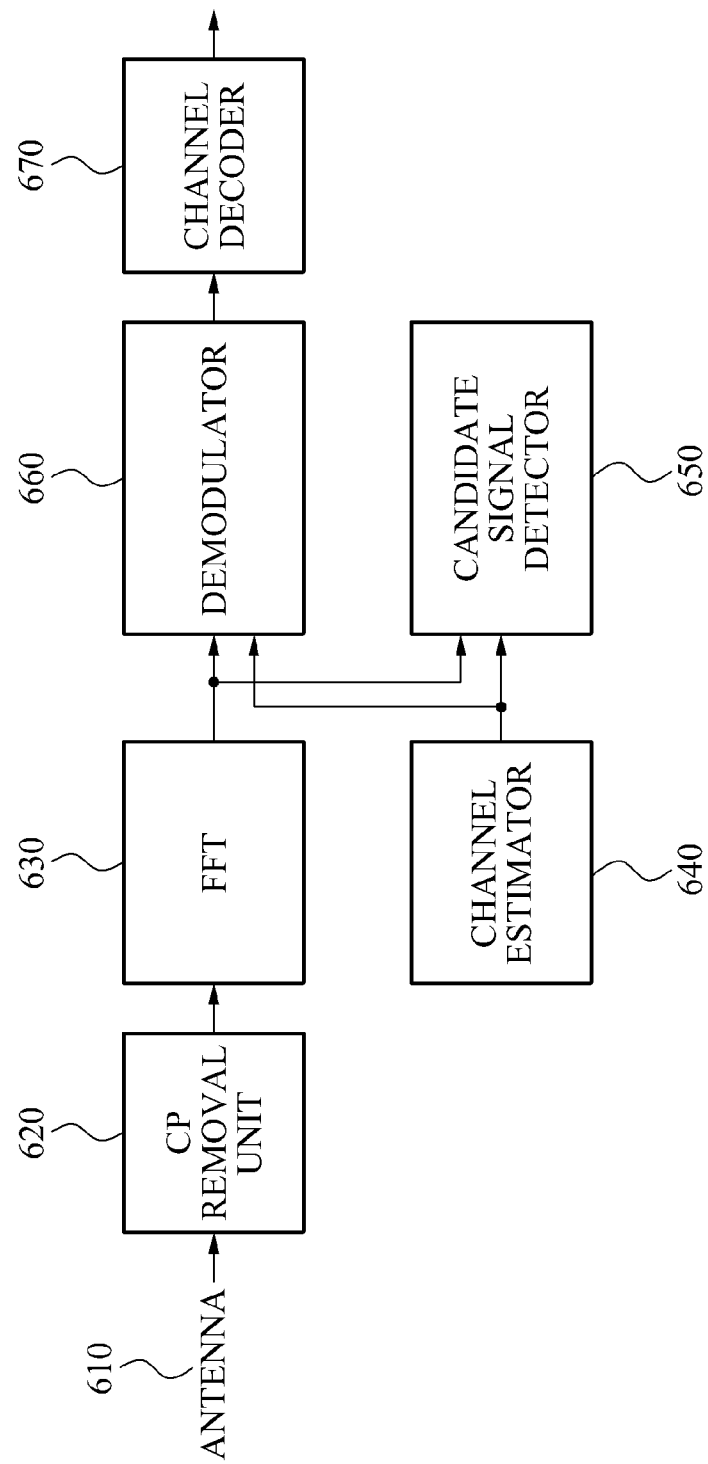
FIG. 6 is a block diagram illustrating a receiver for receiving an OFDM signal using multiple antennas according to an embodiment of the present invention.

FIG. 6 is a block diagram illustrating a receiver 600 for receiving an OFDM signal using multiple antennas according to an embodiment of the present invention.

FIG. 6 illustrates the multi-antenna OFDM receiver 600 using a noise power estimation scheme and a reception power comparison scheme having an independent function with respect to a channel estimation and a detection of a candidate OFDM signal.

The multi-antenna OFDM receiver 600 may convert a signal received via at least one antenna 610 to a baseband discrete signal and then remove a CP from the baseband discrete signal using a CP removal unit 620. The baseband discrete signal in which the CP is removed may be converted to a reception symbol of a frequency domain via a fast Fourier transform (FFT) unit 630, as represented by Equation 7 below. Specifically, a $k^{th}$ subcarrier reception symbol may be converted as represented by the following Equation 7:

$$Y_k = \left( \sum_{j=0}^{n_t-1} i_{j,p(k)}^{(\hat{m})} H_{j,k} \right) \varphi_{p(k)}^{(\hat{m})} X_k + W_k = H_{a_{p(k)}^{(\hat{m})},k} \varphi_{p(k)}^{(\hat{m})} X_k + W_k,$$
$$k = 0, 1, \ldots, N \quad \text{[Equation 7]}$$

Here, $E_S$ denotes a transmission modulation symbol energy and p(k) denotes a subgroup index of a subgroup where a $k^{th}$ subcarrier data modulation symbol belongs.

Also, $X_k$ denotes a $k^{th}$ subcarrier modulation symbol and $a_p^{(m)}$ denotes an index of a transmit antenna via which a transmitted OFDM candidate signal m is transmitted to a $p^{th}$ subgroup $X_p$. $i_{j,p}^{(\hat{m})}$ denotes an indicator with respect to a $p^{th}$ partial signal of a $j^{th}$ antenna of an $m^{th}$ candidate OFDM signal, and $W_k$ denotes added white normalization noise.

A channel estimator 640 may estimate a channel frequency response $H_{j,k}$ for each antenna between a transmitter including a plurality of transmit antennas and a receiver including at least one receive antenna.

Also, the channel estimator 640 may calculate, based on the channel frequency response $H_{j,k}$, a frequency response corresponding to each of candidate OFDM signals that are candidates of an OFDM signal transmitted from the transmitter.

The multi-antenna OFDM receiver 600 may need to be aware of $H_{a_{p(k)}^{(\hat{m})},k} \varphi_{p(k)}^{(\hat{m})}$ so as to demodulate a data symbol $X_k$ transmitted from the reception symbol of the frequency domain of Equation 7.

Here, information associated with $H_{a_{p(k)}^{(\hat{m})},k} \varphi_{p(k)}^{(\hat{m})}$ may be obtained from the channel frequency response $H_{j,k}$ for each antenna and an index $\hat{m}$ of the transmitted candidate OFDM signal.

The candidate signal detector 650 may obtain an index $\hat{m}^*$ of the candidate OFDM signal according to the reception power comparison scheme or the noise power estimation scheme, and then generate $H_{a_{p(k)}^{(\hat{m}^*)},k} \varphi_{p(k)}^{(\hat{m}^*)}$ from the result.

Also, the candidate signal detector 650 may select or detect a single candidate OFDM signal from candidate OFDM signals using the frequency response corresponding to each of the candidate OFDM signals.

An SLM-based technology may use a scheme of transmitting, to a receiver as side information, information associated with the index $\hat{m}$ of the candidate OFDM signal selected by the transmitter. In this case, side information needs to be transmitted for each OFDM symbol and thus, overhead may increase and a transmission efficiency of the transmitter and the receiver may decrease.

Accordingly, as a relatively simple scheme, the candidate signal detector 650 may employ a scheme of demodulating a transmitted OFDM signal without using side information by detecting the index $\hat{m}$ of the candidate OFDM signal.

The multi-antenna OFDM signal receiver 600 may independently estimate the channel frequency response $H_{j,k}$ for each antenna using a preamble symbol and the like.

In this case, an estimate value $\hat{m}^*$ of the index $\hat{m}$ of the candidate OFDM signal may be estimated using, for example, the reception power comparison scheme and the noise power estimation scheme.

For example, as expressed by Equation 8 below, the reception power comparison scheme may calculate a reception power value of a predicted channel for each candidate OFDM signal, and may select a candidate OFDM signal minimizing a square of an error between a power of an actual received signal for each subcarrier and a reception power of each candidate OFDM signal.

$$\hat{m}^* = \arg \min_{0 \leq m \leq M-1} \sum_{k=0}^{N-1} \left( |Y_k|^2 - E_s |H_{a_{p(k)}^{(m)},k}|^2 \right)^2 \quad \text{[Equation 8]}$$

Here, $Y_k$ denotes a $k^{th}$ subcarrier reception symbol, and $H_{a_{p(k)}^{(m)},k}$ denotes an equivalent complex channel amplitude of a $k^{th}$ subcarrier when an $m^{th}$ candidate OFDM signal is transmitted.

As represented by Equation 9 below, the noise power estimation scheme may estimate an index of a transmission signal when the transmission signal is transmitted using a transmit antenna for each subgroup. Specifically, the candidate signal detector 650 may select a single candidate OFDM signal from the candidate OFDM signals so that a distance between an actual received signal and a predicted received signal for each OFDM signal may be minimized $$\hat{m}^* = \arg \min_{0 \leq m \leq M-1} \frac{1}{N} \sum_{k=0}^{N-1} \min_{X \in C} \left| Y_k - H_{a_{p(k)}^{(m)},k} \varphi_{p(k)}^{(m)} X \right|^2. \quad \text{[Equation 9]}$$

Here, C denotes a constellation of a transmission modulation symbol.

Depending on embodiments, the multi-antenna OFDM receiver 600 may modulate data symbols, without receiving side information from a multi-antenna OFDM transmitter corresponding to the multi-antenna OFDM receiver 600.

In this case, the multi-antenna OFDM receiver 600 may independently perform a channel estimation for each subgroup using a pilot symbol subject to a corresponding subgroup. The corresponding multi-antenna OFDM transmitter may transmit symbols of the subgroup by assigning, to a pilot symbol, a portion of symbols $X_{p,k}$, $k \in \Pi_p$ of the subgroup. Next, the multi-antenna OFDM receiver 600 may separate the received symbols into subgroups as expressed by the following Equation 10:

$$\tilde{Y}_{p,k} = \begin{cases} Y_k = \tilde{H}_{p,k} X_k + W_{k,k}, & k \in \prod_p \\ 0, & k \notin \prod_p, \end{cases} \quad \text{[Equation 10]}$$

where $$\tilde{H}_{p,k} = H_{a_p^{(\hat{m})},k} \varphi_p^{(\hat{m})}.$$

Specifically, since a channel frequency response is different for each subgroup, $\tilde{H}_{p,k}$ may be estimated for each subgroup using a pilot symbol transmitted to each subgroup. Each of transmitted data symbols may be modulated using a corresponding estimate value.

A demodulator 660 may coherently demodulate the transmitted data symbols based on the single candidate OFDM signal selected by the candidate signal detector 650.

A channel decoder 670 may restore an information bitstream by performing de-interleaving and channel decoding with respect to a demodulation result of the demodulator 660.

Figure 7:
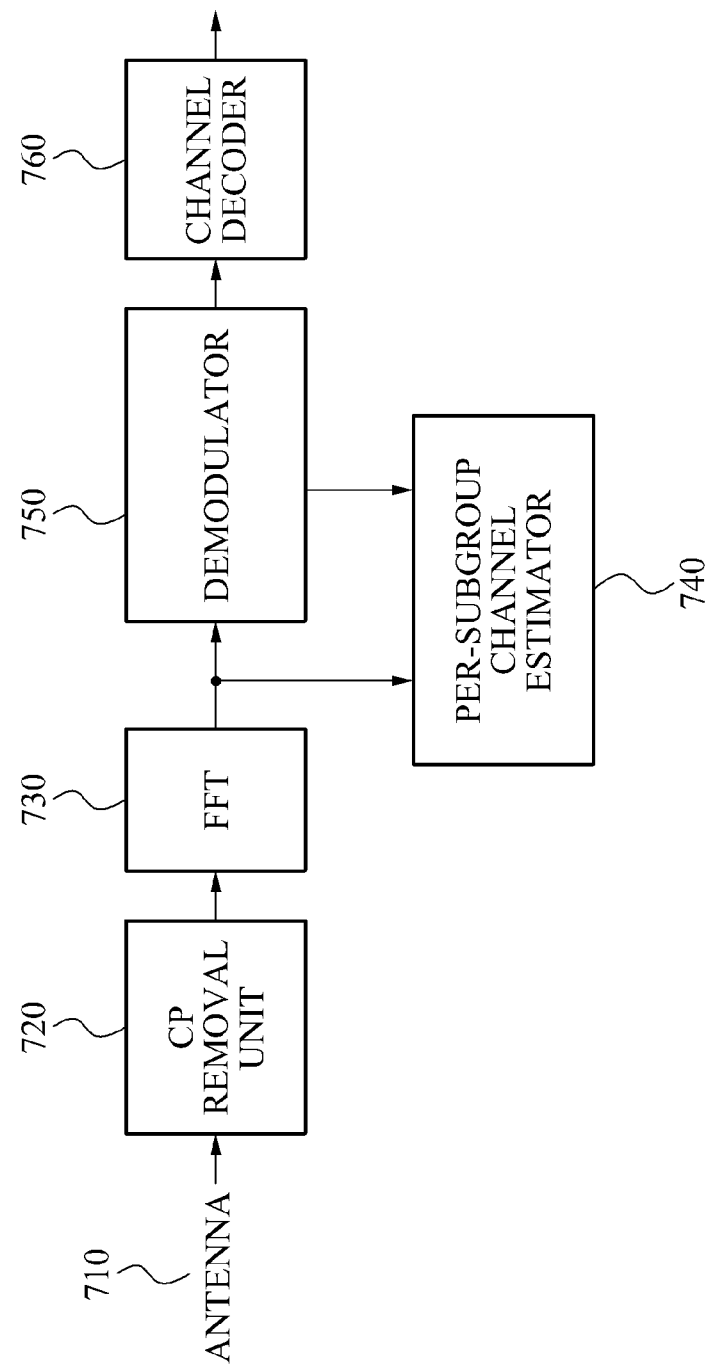
FIG. 7 is a block diagram illustrating a receiver for receiving an OFDM signal using multiple antennas according to another embodiment of the present invention.

FIG. 7 is a block diagram illustrating a receiver 700 for receiving an OFDM signal using multiple antennas according to another embodiment of the present invention.

Referring to FIG. 7, the multi-antenna OFDM receiver 700 may detect a data symbol by performing a channel estimation for each subgroup, without performing a process of detecting a candidate OFDM signal of FIG. 6.

The multi-antenna OFDM receiver 700 may convert a signal received via at least one antenna 710 to a baseband discrete signal and then remove a CP from the baseband discrete signal using a CP removal unit 720.

The baseband discrete signal in which the CP is removed may be converted to a reception data symbol of a frequency domain via an FFT 730, as expressed by Equation 7. A per-subgroup channel estimator 740 may estimate $\tilde{H}_{p,k} = H_{a_p^{(\hat{m})},k} \varphi_p^{(\hat{m})}$ and a demodulator 750 may demodulate the transmission data symbol using the estimate value.

A demodulation result may be transferred to a channel decoder 760 and an information bitstream may be restored using de-interleaving and channel decoding.

According to an embodiment of the present invention, in a multi-antenna OFDM transmitter and a multi-antenna OFDM receiver where a number of transmit antennas is at least three, a combined scheme may be considered where an STBC scheme and an antenna switching diversity scheme are combined. (See S. M. Alamouti, "A simple transmit diversity technique for wireless communications" IEEE J. Select. Area Commun., vol. 16, no. 1, pp. 1522, February 1998.)

The combined scheme may transmit, using different antennas, two STBC outputs $X_0=[X_0 -X_1^* X_2 \ldots X_{N-2} -X_{N-1}^*]$ and $X_1=[X_1\ X_0^* X_3\ \ldots\ X_{N-1} X_{N-2}^*]$ when a PAPR reduction scheme is not applied. For example, when the number of transmit antennas is four, IFFT input symbol streams for the four transmit antenna may correspond to $[X_0 -X_1^* 00 X_4 -X_5 00]$, $[X_1 X_0^* 00 X_5 X_4 \ldots 00]$, $[00 X_2 -X_3^* 00 \ldots X_{N-2} -X_{N-1}^*]$, and $[00 X_3 X_2^* 00 \ldots X_{N-1} X_{N-2}^*]$.

Hereinafter, a demodulation scheme in the multi-antenna OFDM receiver corresponding to the multi-antenna OFDM transmitter using an STBC scheme described above with reference to FIG. 5 will be described.

For example, when the STBC, the antenna switching diversity scheme, and the PAPR reduction scheme are applied to the multi-antenna OFDM receiver 700 where a number of to transmit antennas is at least three, a data symbol of a frequency domain received by the multi-antenna OFDM receiver 700 may be expressed by the following Equation 11:

$$Y_{2k} = \quad \text{[Equation 11]}$$

$$H_{a_{0,p(2k)}^{(\hat{m})},2k} \varphi_{0,p(2k)}^{(\hat{m})} X_{2k} + H_{a_{1,p(2k)}^{(\hat{m})},2k} \varphi_{1,p(2k)}^{(\hat{m})} X_{2k+1} + W_{2k},$$

$$Y_{2k+1} = -H_{a_{0,p(2k)}^{(\hat{m})},2k} \varphi_{0,p(2k)}^{(\hat{m})} X_{2k+1}^* +$$

$$H_{a_{1,p(2k)}^{(\hat{m})},2k} \varphi_{1,p(2k)}^{(\hat{m})} X_{2k}^* + W_{2k+1},$$

$$k = 0, 1, \ldots, N/2 - 1$$

Here, $a_{l,p}^{(\hat{m})}$ denotes an index of an antenna via which a $p^{th}$ subgroup $X_{l,p}$ of an $l^{th}$ STBC symbol is transmitted among selected candidate OFDM signals $\{s_0^{(\hat{m})}, s_1^{(\hat{m})}, \ldots, S_{n_t-1}^{(\hat{m})}\}$.

A scheme of demodulating the received data symbol of the frequency domain may include a scheme of independently estimating a channel frequency response $H_{j,k}$ and an index $\hat{m}$ of a candidate OFDM signal, which is similar to a technology used when the STBC scheme is absent, and a scheme of estimating a channel for each subgroup to thereby estimate a candidate OFDM signal.

Here, when the channel frequency response $H_{j,k}$ can be independently estimated, the index $\hat{m}$ of the candidate OFDM signal may be estimated using the following two schemes.

One is a scheme of selecting a candidate OFDM signal so that a square of an error between a power of an actual received signal for each subcarrier and a reception power of each candidate OFDM signal may be minimized, which is expressed by Equation 12 below. Another is a scheme of selecting an estimate value $\hat{m}^*$ having a minimum distance with respect to all the candidate OFDM signals after equalizing a time space encoding symbol, and thereby estimating a noise power, which is expressed by Equation 13 below.

$$\hat{m}^* = \arg \min_{0 \le m \le M-1} \sum_{k=0}^{N-1} \left( |Y_k|^2 - E_s \sum_{l=0}^{1} |H_{a_{l,p(k)}^{(m)},k}|^2 \right)^2 \quad \text{[Equation 12]}$$

Here, N denotes a number of subcarriers and $H_{a_{l,p(k)}^{(m)},k}$ denotes a complex channel amplitude in a $k^{th}$ subcarrier when an $m^{th}$ candidate OFDM signal is transmitted.

$$\text{[Equation 13]}$$

$$\hat{m}^* = \arg \min_{0 \le m \le M-1} \frac{1}{N} \sum_{k=0}^{N-1} \min_{X \in C} \left| Z_k^{(m)} - \sqrt{\frac{1}{2} \left( |H_{a_{0,p(k)}^{(m)}}|^2 + |H_{a_{1,p(k)}^{(m)}}|^2 \right)} X \right|^2.$$

Here,

-continued $$Z_{2k}^{(m)} = H_{a_{0,p(2k)}^{(m)}}^* (\varphi_{0,p(2k)}^{(m)})^* Y_{2k} + H_{a_{1,p(2k)}^{(m)}}^* (\varphi_{1,p(2k)}^{(m)})^* Y_{2k+1}^*$$

$$Z_{2k+1}^{(m)} = H_{a_{1,p(2k)}^{(m)}}^* (\varphi_{1,p(2k)}^{(m)})^* Y_{2k} - H_{a_{0,p(2k)}^{(m)}}^* (\varphi_{0,p(2k)}^{(m)})^* Y_{2k}^*,$$

for $k = 0, 1, \ldots, N/2 - 1$.

When the channel estimation is performed for each subgroup, the multi-antenna OFDM transmitter may transmit a subgroup including a pilot symbol by including a pilot symbol orthogonal to each STBC encoded symbol for each group. The multi-antenna OFDM receiver 700 corresponding to the multi-antenna OFDM transmitter may separate the received symbol into the following subgroups.

$$\tilde{Y}_{p,k} = \sqrt{\frac{1}{2}} \tilde{H}_{0,p,k} X_{0,k} + \sqrt{\frac{1}{2}} \tilde{H}_{1,p,k} X_{1,k} + W_k, k \in \Pi_p$$

Here, $\tilde{H}_{l,p,k} = H_{l, a_p^{(\tilde{m})}, k} \phi_{l,p}^{(\tilde{m})}$ and $X_{l,k}$ denotes a $k^{th}$ element of $X_l$.

Next, a transmission data symbol may be obtained using a demodulation scheme of the STBC encoded symbol by independently estimating $\tilde{H}_{l,p,k}$ using a pilot for each STBC encoded symbol.

Figure 8:
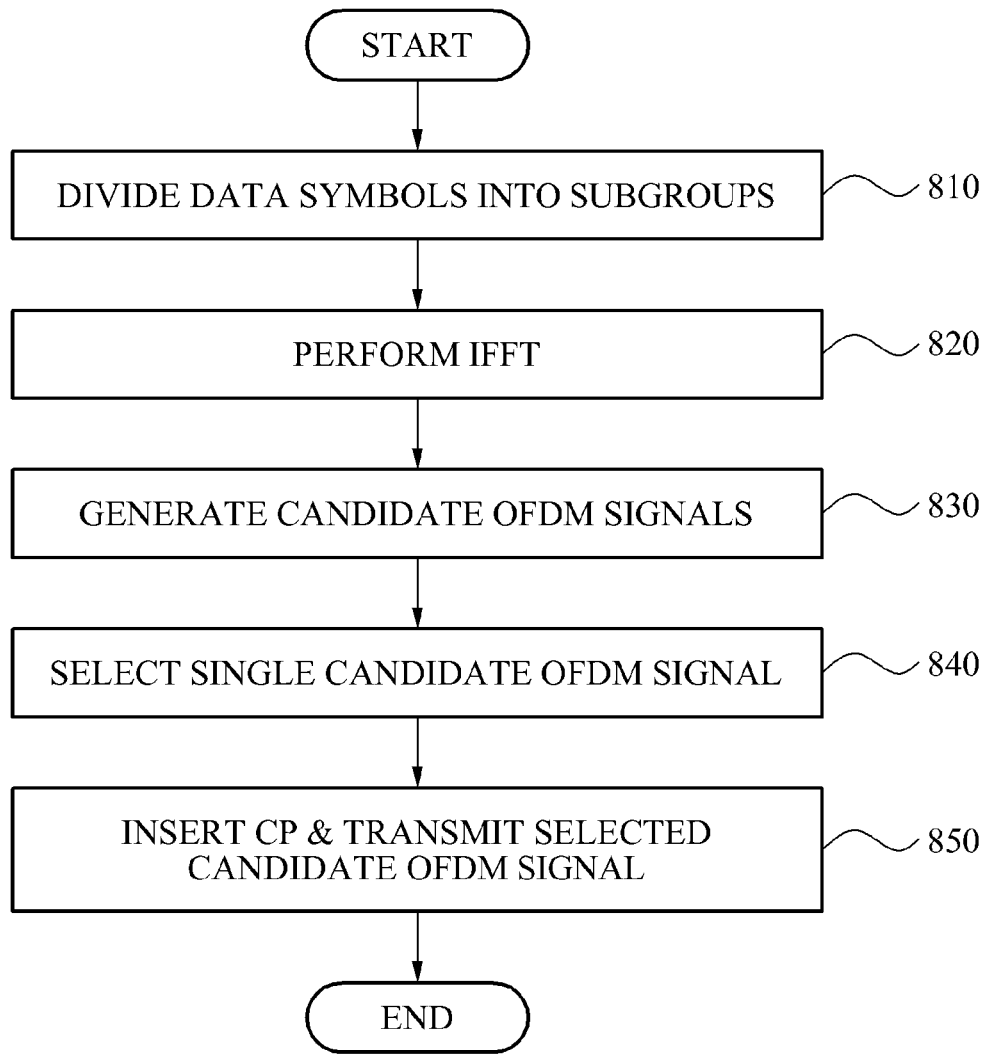
FIG. 8 is a flowchart illustrating a method of transmitting an OFDM signal using multiple antennas according to an embodiment of the present invention.

FIG. 8 is a flowchart illustrating a method of transmitting an OFDM signal using multiple antennas according to an embodiment of the present invention.

Referring to FIG. 8, the multi-antenna OFDM transmission method may include operation 810 of dividing data symbols of a frequency domain into a plurality of subgroups, operation 820 of performing an IFFT, operation 830 of generating candidate OFDM signals 830, operation 840 of selecting a single candidate OFDM signal, and operation 850 of inserting a CP and transmitting the selected candidate OFDM signal.

Specifically, in operation 810, the data symbols of the frequency domain may be divided into the plurality of subgroups.

In operation 820, an IFFT may be performed with respect to each of the subgroups so as to generate partial signals of a time domain corresponding to the plurality of subgroups.

In operation 830, at least two candidate OFDM signals may be generated using a combination of the partial signals so that each of the partial signals may be transmitted to one of transmit antennas.

Also, in operation 830, the at least two candidate OFDM signals may be generated by combining the partial signals so that a correlation and an overlapping rate between the partial signals may decrease. Here, the at least two candidate OFDM signals may satisfy Equation 1-1 and Equation 1-2.

In operation 840, a single candidate OFDM signal may be selected from the at least two candidate OFDM signals. For example, in operation 840, the single candidate OFDM signal may be selected from the at least two candidate OFDM signals based on a PAPR of each candidate OFDM signal.

In operation 850, the selected candidate OFDM signal may be inserted with a CP and thereby be transmitted using a transmit antenna.

Depending on embodiments, a multi-antenna OFDM signal may be transmitted using an STBC symbol. In this case, a symbol of a frequency domain may be encoded to at least two STBC symbols. The at least two STBC symbols may be divided into a plurality of subgroups.

Next, to generate partial signals of a time domain corresponding to each of the subgroups, an IFFT may be performed with respect to each of the subgroups.

To make it possible to transmit each of the partial signals to one of transmit antennas, at least two candidate OFDM signals may be generated using a combination of the partial signals and a single candidate OFDM signal may be selected from the at least two candidate OFDM signals.

The selected candidate OFDM signal may be inserted with a CP and thereby be transmitted using the transmit antenna.

Figure 9:
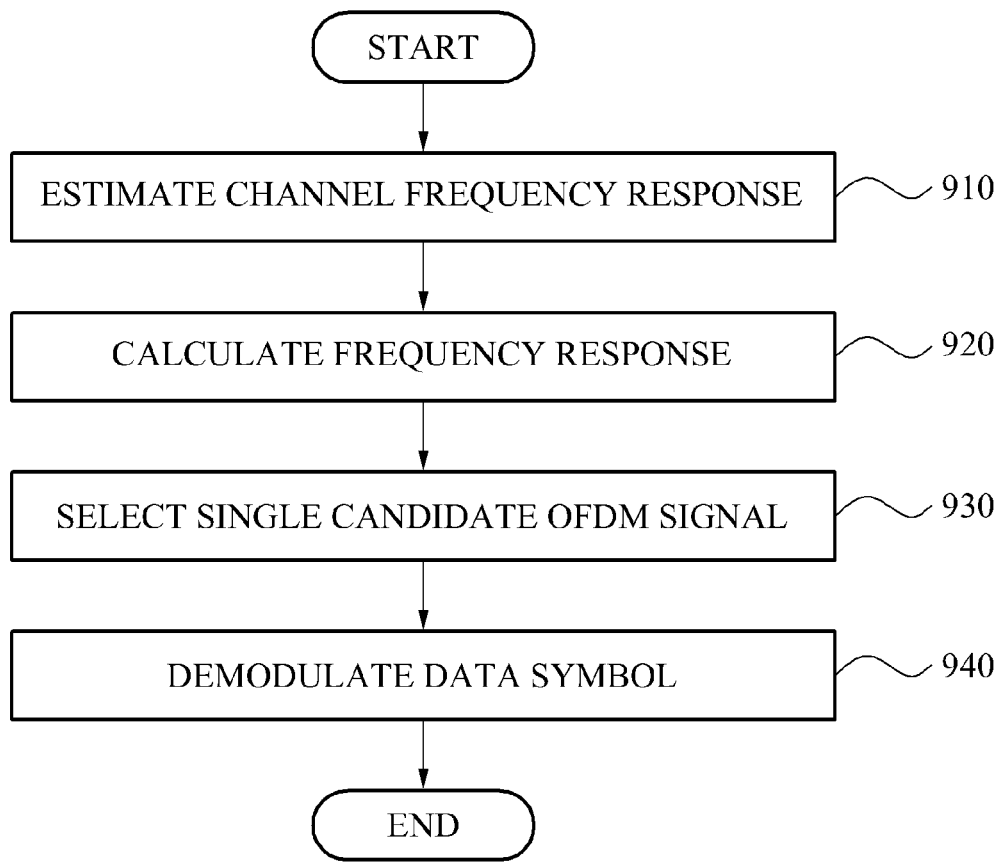
FIG. 9 is a flowchart illustrating a method of receiving an OFDM signal using multiple antennas according to an embodiment of the present invention.

FIG. 9 is a flowchart illustrating a method of receiving an OFDM signal using multiple antennas according to an embodiment of the present invention.

Referring to FIG. 9, the multi-antenna OFDM receiving method may include operation 910 of estimating a channel frequency response, operation 920 of calculating a frequency response, operation 930 of selecting a single candidate OFDM signal from candidate OFDM signals, and operation 940 of demodulating a data symbol.

In operation 910, a channel frequency response between a transmitter including a plurality of transmit antennas and a receiver including at least one receive antenna may be estimated.

In operation 920, a frequency response corresponding to each of candidate OFDM signals that are candidates of an OFDM signal transmitted from the transmitter may be calculated based on the channel frequency response.

In operation 930, a single candidate OFDM signal may be selected from the candidate OFDM signals using the frequency response corresponding to each of the candidate OFDM signals. When selecting the single candidate OFDM signal, a reception power comparison scheme or a noise power comparison scheme may be used.

When using a power reception difference, the single candidate OFDM signal may be selected from the candidate OFDM signals so that a difference between an actual reception power and a reception power of each candidate OFDM signal may be minimized in operation 930.

Also, when using the noise power, the single candidate OFDM signal may be selected from the candidate OFDM signals so that a distance between the actual received signal and a predicted received signal with respect to each candidate OFDM signal may be minimized in operation 930.

In operation 940, data symbols transmitted from the transmitter may be demodulated based on the selected candidate OFDM signal.

Figure 10:
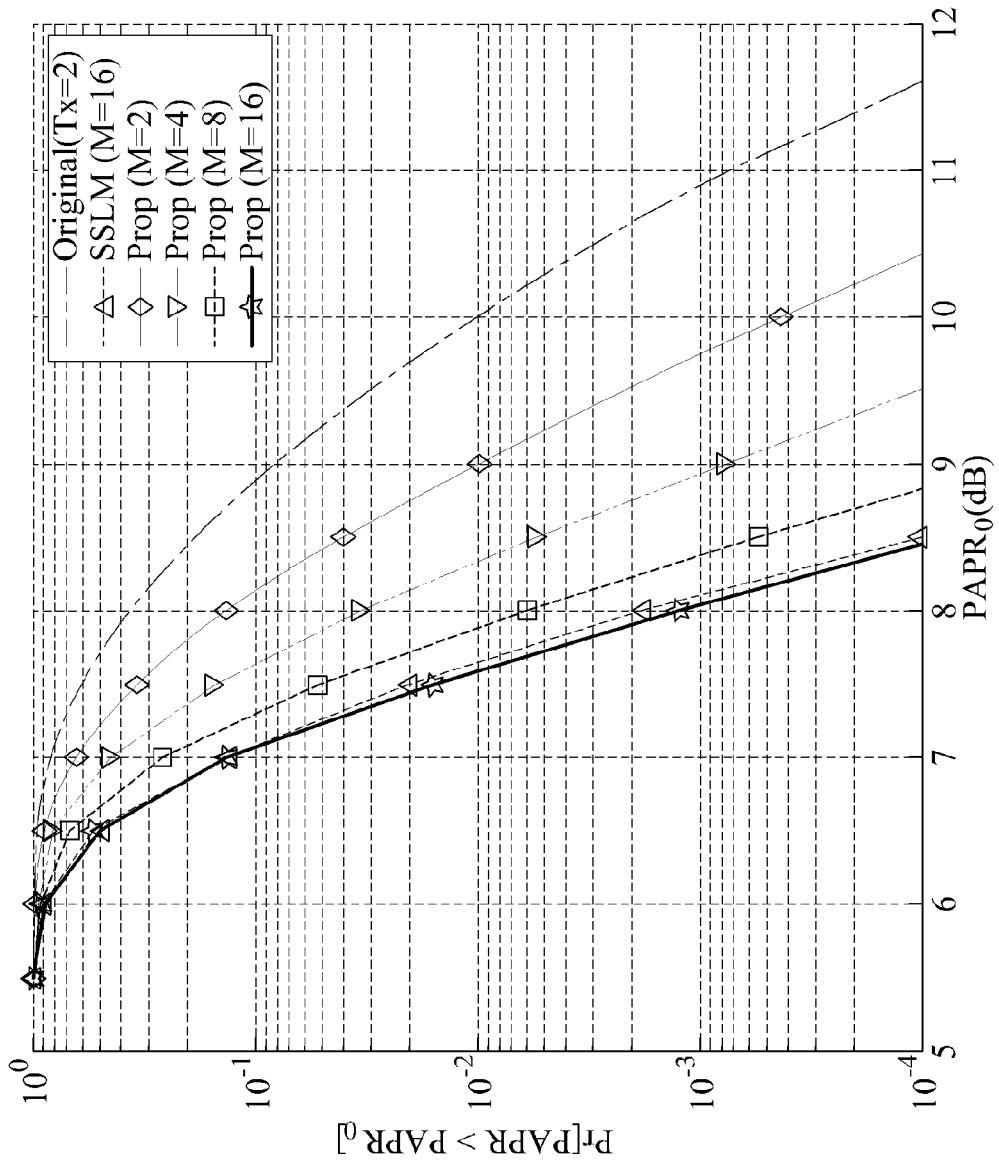
FIG. 10 is a graph illustrating a complementary cumulative distribution function (CCDF) performance of a PAPR based on a number of candidate OFDM signals according to an embodiment of the present invention.

FIG. 10 is a graph illustrating a complementary cumulative distribution function (CCDF) performance of a PAPR based on a number of candidate OFDM signals according to an embodiment of the present invention.

In FIG. 10, the CCDF of the PAPR indicates a probability that when M candidate OFDM signals are generated according to Equation 3 in a case where N=128, $n_t$=2, P=8, and a QPSK modulation scheme is applied in a multi-antenna OFDM system using an antenna switching diversity, the PAPR is greater than a threshold. Here, M=2, 4, 8, 16.

Also, "Original (Tx=2)" denotes an OFDM signal where a PAPR reduction scheme is not applied. "Prop" denotes an OFDM signal where the PAPR reduction scheme is applied. "SSLM" denotes an OFDM signal according to an SLM-based PAPR reduction scheme disclosed in Robert F. H. Fischer and M. Hoch, "Peak-to-average power ratio reduction in MIMO OFDM" ICC 2007, pp. 762-767, June 2007.

As shown in FIG. 10, when M=16, the scheme according to an embodiment of the present invention shows a relatively excellent performance compared to the SSML scheme.

In particular, the SSLM scheme performs M IFFTs, whereas the method of the present invention may perform the same number of IFFTs as a number of subgroups. Accordingly, when M=16, the SSML may perform 32 IFFTs and the scheme of the present invention may perform eight IFFTs. Accordingly, it is possible to provide a similar PAPR performance to the SSLM scheme with a less complexity.

Figure 11:
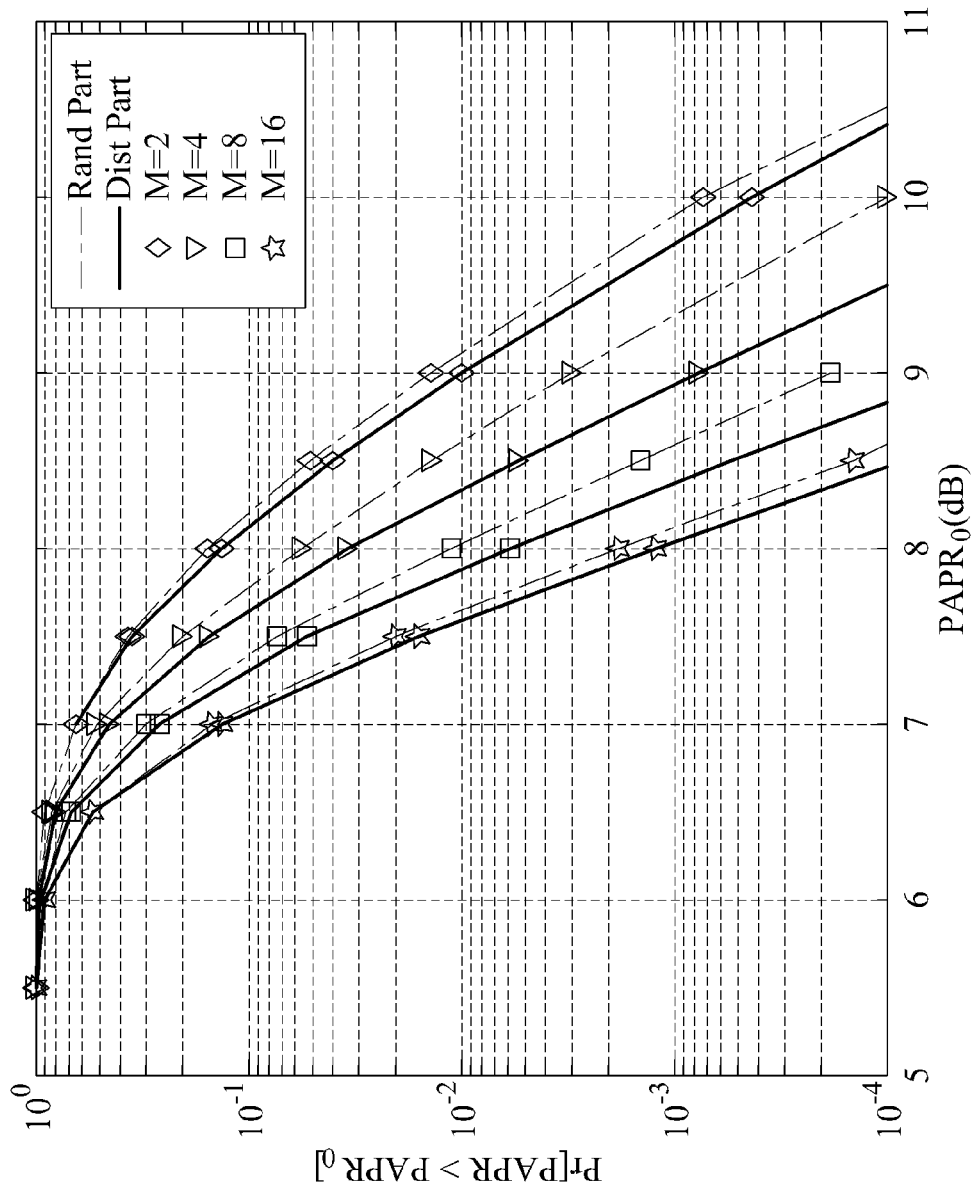
FIG. 11 is a graph illustrating a CCDF performance of a PAPR based on a subgroup antenna mapping scheme according to an embodiment of the present invention.

FIG. 11 is a graph illustrating a CCDF performance of a PAPR based on a subgroup antenna mapping scheme according to an embodiment of the present invention.

In FIG. 11, it is assumed that N 128, $n_t=2$, P=8, and a candidate OFDM signal is generated according to Equation 3 by applying a QPSK modulation scheme in a multi-antenna OFDM transmitter and receiver using an antenna switching diversity.

Here, in a performance of a case "Dist" where M candidate OFDM signals are selected based on Equation 5 and a performance of a case "Rand" where M candidate OFDM signals are randomly selected without using Equation 5, a PAPR performance may be further enhanced when the M candidate OFDM signals are selected so that a distance between indicators corresponding to antennas with respect to partial signals may be maximized with respect to the same number of candidate OFDM signals.

Figure 12:
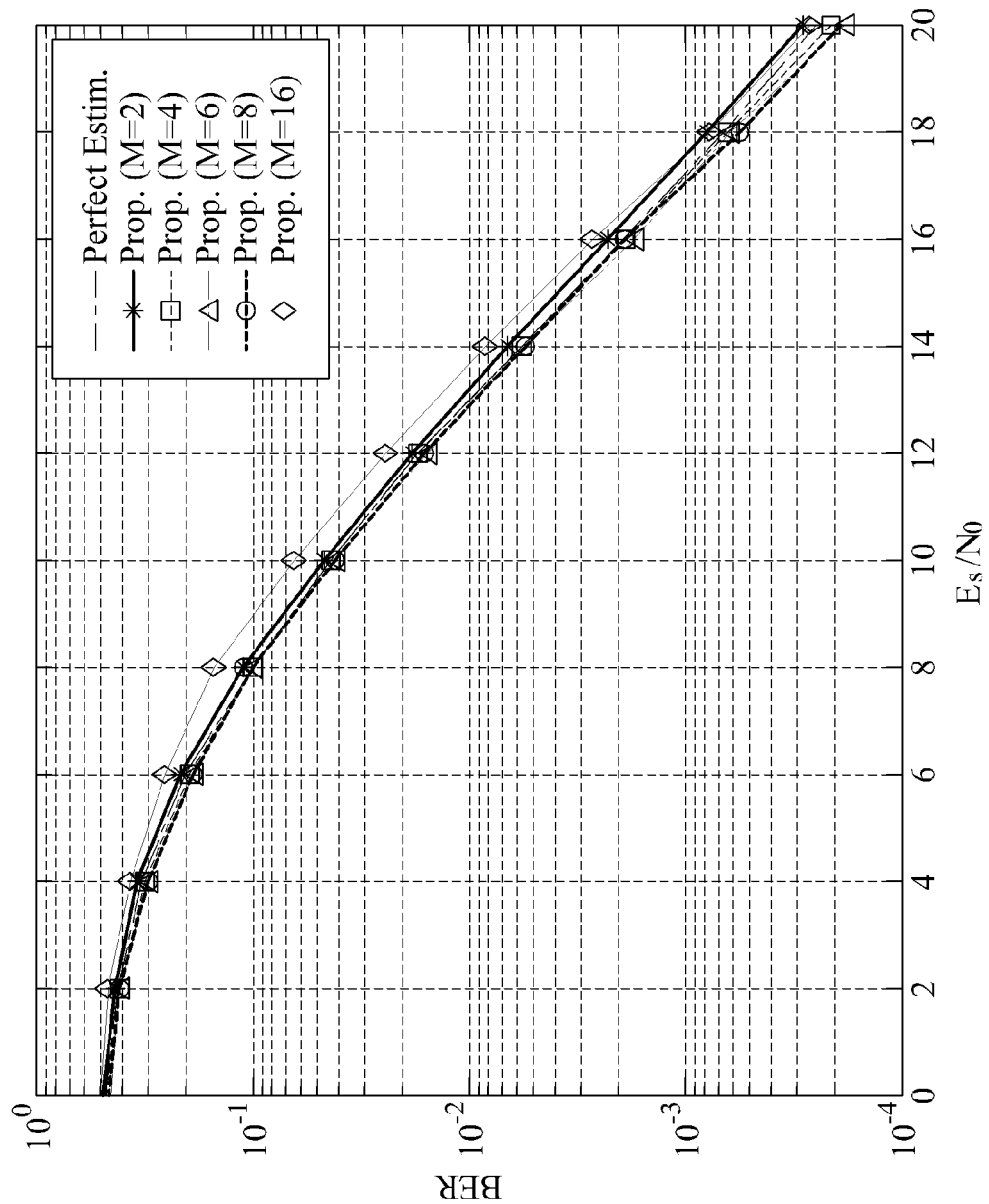
FIG. 12 is a graph illustrating a bit error rate when a multi-antenna OFDM receiver applies a candidate signal detection according to an embodiment of the present invention.

FIG. 12 is a graph illustrating a bit error rate based on an average signal to noise ratio $E_s/N_0$ when a multi-antenna OFDM receiver applies a candidate signal detection according to an embodiment of the present invention.

In FIG. 12, it is assumed that N=128, $n_t=2$, P=8, and a convolutional encoding scheme used by an Institute of Electrical and Electronics Engineers (IEEE) 802.11 wireless local area network (LAN) and a QPSK modulation scheme are applied.

Specifically, FIG. 12 shows a bit error rate performance when the multi-antenna OFDM receiver estimates m̂ according to Equation 8, without using side information associated with an index of a candidate OFDM signal. Here, a length of a convolutional code is 7 and an encoding rate is ½.

As shown in FIG. 12, when m̂ is exactly known, the bit error rate performance in "Perfect Est." and the bit error performance when estimating m̂ may show a slight difference based on a number of candidate OFDM signals in a corresponding SNR area, and thus may barely vary. Accordingly, depending on embodiments, it is possible to demodulate a transmission data symbol without using side information associated with a candidate OFDM signal.

Descriptions related to the multi-antenna OFDM transmitter and the multi-antenna OFDM receiver made above with reference to FIG. 2 through FIG. 9 may be applicable to the multi-antenna OFDM transmitting method and the multi-antenna OFDM receiving method described above with reference to FIG. 8 and FIG. 9.

The above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A transmitter for transmitting an orthogonal frequency division multiplexing (OFDM) signal using multiple antennas, comprising:

a subgroup generator configured to divide data symbols of a frequency domain into a plurality of subgroups;

an inverse fast Fourier transform (IFFT) unit configured to perform an IFFT with respect to each of the subgroups so as to generate partial signals of a time domain corresponding to the plurality of subgroups, respectively;

a candidate OFDM signal generator configured to generate at least two candidate OFDM signals using a combination of the partial signals so that each of the partial signals is transmitted to one of transmit antennas; and a selector configured to select one of the at least two candidate OFDM wherein the at least two candidate OFDM signals satisfy the following equation:

$$s_j^{(m)} = \sum_{p=0}^{P-1} i_{j,p}^{(m)} \tilde{x}_p,$$

where $s_j^{(m)}$ denotes a $j^{th}$ antenna signal of an $m^{th}$ candidate OFDM signal for P subgroups, $i_{j,p}^{(m)}$ subject to $$\sum_{j=0}^{n_t-1} i_{j,p}^{(m)} = 1$$

denotes an indicator, and $\tilde{x}_p$ denotes a partial signal of the $p^{th}$ subgroup, where $n_t$ denotes a number of antennas.

2. The transmitter of claim 1, wherein the subgroup generator is configured to divide, into the plurality of subgroups, data symbols adjacent to each other, data symbols spaced apart from each other at equivalent intervals, or data symbols randomly positioned in the frequency domain.

3. The transmitter of claim 1, wherein the candidate OFDM signal generator is configured to generate the at least two candidate OFDM signals by combining the partial signals so that a correlation between the partial signals decreases.

4. The transmitter of claim 1, wherein the at least two candidate OFDM signals satisfy the following equation so that a similar number of subgroups are assigned to each of transmit antennas:

$$\sum_{p=0}^{P-1} i_{j,p}^{(m)} = P/n_t,$$

where P denotes a number of subgroups, $n_t$ denotes a number of antennas, and $i_{j,p}^{(m)}$ denotes the indicator indicating whether the $p^{th}$ subgroup is assigned to the $j^{th}$ antenna signal of the $m^{th}$ candidate OFDM signal and has a value of "1" when the $p^{th}$ subgroup is assigned, and has a value of "0" when the $p^{th}$ subgroup is unassigned.

5. The transmitter of claim 1, wherein the selector is configured to select one of the at least two candidate OFDM signals based on a Peak-to-Average Power Ratio (PAPR) of each of the at least two candidate OFDM signals.

6. A transmitter for transmitting an OFDM signal using multiple antennas, comprising:

a space time encoder configured to encode a symbol stream of a frequency domain into at least two Space Time Block Code (STBC) symbol streams;

a subgroup generator configured to divide the at least two STBC symbol streams into a plurality of subgroups;

an IFFT unit configured to perform an IFFT with respect to each of the subgroups so as to generate partial signals of a time domain corresponding to the plurality of subgroups, respectively;

a candidate OFDM signal generator configured to generate at least two candidate OFDM signals using a combination of the partial signals so that each of the partial signals is transmitted to one of transmit antennas; and a selector configured to select one of the at least two candidate OFDM signals, wherein the at least two candidate OFDM signals satisfy the following equation:

$$s_j^{(m)} = \frac{1}{\sqrt{2}} \sum_{p=0}^{P-1} \sum_{l=0}^{1} i_{j,l,p}^{(m)} \varphi_{l,p}^{(m)} \tilde{x}_{l,p},$$

where $s_j^{(m)}$ denotes a $j^{th}$ antenna signal of an $m^{th}$ candidate OFDM signal for P subgroups, $i_{j,l,p}^{(m)}$ denotes an indicator indicating whether a $p^{th}$ subgroup of an $l^{th}$ STBC symbol stream is assigned to a $j^{th}$ antenna signal of the $m^{th}$ candidate OFDM signal and has a value of "1" when the $p^{th}$ subgroup is assigned, and has a value of "0" when the $p^{th}$ subgroup is unassigned, $\phi_{l,p}^{(m)}$ denotes a phase shift value given to a partial signal of the $p^{th}$ subgroup of the $l^{th}$ STBC symbol stream when generating the $m^{th}$ candidate OFDM signal, and $\tilde{x}_{l,p}$, denotes a partial signal of the $p^{th}$ subgroup of the $l^{th}$ STBC symbol stream.

7. A method of transmitting an OFDM signal using multiple antennas, comprising:

dividing data symbols of a frequency domain into a plurality of subgroups;

performing an IFFT with respect to each of the subgroups so as to generate partial signals of a time domain corresponding to the plurality of subgroups, respectively;

generating at least two candidate OFDM signals using a combination of the partial signals so that each of the partial signals is transmitted to one of transmit antennas;

selecting one of the at least two candidate OFDM signals; and inserting a cyclic prefix into the selected candidate OFDM signal and transmitting the candidate OFDM signal with the inserted cyclic prefix using a transmit antenna, wherein the at least two candidate OFDM signals satisfy the following equation:

$$s_j^{(m)} = \sum_{p=0}^{P-1} i_{j,p}^{(m)} \tilde{x}_p,$$

where $s_j^{(m)}$ denotes a $j^{th}$ antenna signal of an $m^{th}$ candidate OFDM signal for P subgroups, $i_{j,p}^{(m)}$ denotes an indicator indicating whether a $p^{th}$ subgroup is assigned to a $j^{th}$ antenna signal of the $m^{th}$ candidate OFDM signal and has a value of "1" when the $p^{th}$ subgroup is assigned, and has a value of "0" when the $p^{th}$ subgroup is unassigned, and $\tilde{x}_p$ denotes a partial signal of the $p^{th}$ subgroup.

8. The method of claim 7, wherein the generating comprises generating the at least two candidate OFDM signals by combining the partial signals so that a correlation between the partial signals decreases.

9. The method of claim 7, wherein the selecting comprises selecting one of the at least two candidate OFDM signals based on a PAPR of each of the at least two candidate OFDM signals.

10. A method of transmitting an OFDM signal using multiple antennas, comprising:

encoding a symbol stream of a frequency domain to at least two STBC symbol streams;

dividing the at least two STBC symbol streams into a plurality of subgroups;

performing an IFFT with respect to each of the subgroups so as to generate partial signals of a time domain corresponding to the plurality of subgroups, respectively;

generating at least two candidate OFDM signals using a combination of the partial signals so that each of the partial signals is transmitted to one of transmit antennas;

selecting one of the at least two candidate OFDM signals; and inserting a cyclic prefix into the selected candidate OFDM signal to transmit the candidate OFDM signal with the inserted cyclic prefix, wherein the at least two candidate OFDM signals satisfy the following equation:

$$s_j^{(m)} = \frac{1}{\sqrt{2}} \sum_{p=0}^{P-1} \sum_{l=0}^{1} i_{j,l,p}^{(m)} \varphi_{l,p}^{(m)} \tilde{x}_{l,p},$$

where $s_j^{(m)}$ denotes a $j^{th}$ antenna signal of an $m^{th}$ candidate OFDM signal for P subgroups, $i_{j,l,p}^{(m)}$ denotes an indicator indicating whether a $p^{th}$ subgroup of an $l^{th}$ STBC symbol stream is assigned to a $j^{th}$ antenna signal of the $m^{th}$ candidate OFDM signal and has a value of "1" when the $p^{th}$ subgroup is assigned, and has a value of "0" when the $p^{th}$ subgroup is unassigned, $\phi_{l,p}^{(m)}$ denotes a phase shift value given to a partial signal of the $p^{th}$ subgroup of the $l^{th}$ STBC symbol stream when generating the $m^{th}$ candidate OFDM signal, and $\tilde{x}_{l,p}$, denotes a partial signal of the $p^{th}$ subgroup of the $l^{th}$ STBC symbol stream.

11. A transmitter for transmitting an orthogonal frequency division multiplexing (OFDM) signal using multiple antennas, comprising:

a subgroup generator configured to divide data symbols of a frequency domain into a plurality of subgroups;

an inverse fast Fourier transform (IFFT) unit configured to perform an IFFT with respect to each of the subgroups so as to generate partial signals of a time domain corresponding to the plurality of subgroups, respectively;

a candidate OFDM signal generator configured to generate at least two candidate OFDM signals using a combination of the partial signals so that each of the partial signals is transmitted to one of transmit antennas; and a selector configured to select one of the at least two candidate OFDM signals, wherein the at least two candidate OFDM signals satisfy the following equation:

$$s_j^{(m)} = \sum_{p=0}^{P-1} i_{j,p}^{(m)} \varphi_p^{(m)} \tilde{x}_p,$$

where $s_j^{(m)}$ denotes a $j^{th}$ antenna signal of an $m^{th}$ candidate OFDM signal for P subgroups, $i_{j,p}^{(m)}$ denotes an indicator indicating whether a $p^{th}$ subgroup is assigned to a $j^{th}$ antenna signal of the $m^{th}$ candidate OFDM signal and has a value of "1" when the $p^{th}$ subgroup is assigned, and has a value of "0" when the $p^{th}$ subgroup is unassigned, $\phi_p^{(m)}$ denotes a phase shift value given to a partial signal of the $p^{th}$ subgroup when generating the $m^{th}$ candidate OFDM signal, and $\tilde{x}_p$ denotes a partial signal of the $p^{th}$ subgroup.

12. A method of transmitting an OFDM signal using multiple antennas, comprising:

dividing data symbols of a frequency domain into a plurality of subgroups;

performing an IFFT with respect to each of the subgroups so as to generate partial signals of a time domain corresponding to the plurality of subgroups, respectively;

generating at least two candidate OFDM signals using a combination of the partial signals so that each of the partial signals is transmitted to one of transmit antennas;

selecting one of the at least two candidate OFDM signals; and inserting a cyclic prefix into the selected candidate OFDM signal and transmitting the candidate OFDM signal with the inserted cyclic prefix using a transmit antenna, wherein the at least two candidate OFDM signals satisfy the following equation:

$$s_j^{(m)} = \sum_{p=0}^{P-1} i_{j,p}^{(m)} \varphi_p^{(m)} \tilde{x}_p,$$

where $s_j^{(m)}$ denotes a $j^{th}$ antenna signal of an $m^{th}$ candidate OFDM signal for P subgroups, $i_{j,p}^{(m)}$ denotes an indicator indicating whether a $p^{th}$ subgroup is assigned to a $j^{th}$ antenna signal of the $m^{th}$ candidate OFDM signal and has a value of "1" when the $p^{th}$ subgroup is assigned, and has a value of "0" when the $p^{th}$ subgroup is unassigned, $\phi_p^{(m)}$ denotes a phase shift value given to a partial signal of the $p^{th}$ subgroup when generating the $m^{th}$ candidate OFDM signal, and $\tilde{x}_p$ denotes a partial signal of the $p^{th}$ subgroup.

13. The transmitter of claim 1, wherein the candidate OFDM signal generator is configured to generate the at least two candidate OFDM signals by selecting a set of indicator vectors maximizing a minimum Hamming distance between indicator vectors used to generate a plurality of candidate OFDM signals, as expressed by the following equation:

$$\hat{I}_S = \arg \max_{I_S} d_{min}(I_S),$$

where $I_S = \{i_j^{(m)}, j=0, \ldots, n_t-1, m=0, 1, \ldots, M-1\}$ is a set of indicator vectors for $n_t$ transmit antennas and M candidate OFDM signals and $I_S$, $i_j^{(m)} = (i_{j,0}^{(m)}, i_{j,1}^{(m)}, \ldots, i_{j,P-1}^{(m)})$ denotes an indicator vector for the $j^{th}$ antenna signal of the $m^{th}$ candidate OFDM signal for P subgroups, with element $i_{j,p}^{(m)}$ denoting an indicator indicating whether a $p^{th}$ subgroup is assigned to a $j^{th}$ antenna signal of the $m^{th}$ candidate OFDM signal and has a value of "1" when the $p^{th}$ subgroup is assigned and has a value of "0" when the $p^{th}$ subgroup is unassigned subject to $$\sum_{j=0}^{n_t-1} i_{j,p}^{(m)} = 1, \; d_{min}(I_S) = \min_{\substack{0 \le j \le n_t-1 \\ 0 \le m_1 \ne m_2 \le M-1}} w\left(i_j^{(m_1)} \oplus i_j^{(m_2)}\right)$$

is the minimum Hamming distance between indicator vectors in a set $I_S$, $\oplus$ denotes an exclusive OR, and $w(\cdot)$ denotes a Hamming weight function counting the number of elements having a value of "1" in the argument vector.

* * * * *